US012755359B1

(12) United States Patent
Gupta et al.

(10) Patent No.: US 12,755,359 B1
(45) Date of Patent: Oct. 6, 2026

(54) APPARATUS FOR AND METHOD OF GENERATING A SYNTHETIC IMAGE AS A FUNCTION OF A SLIDE IMAGE

(71) Applicant: Pramana, Inc., Cambridge, MA (US)

(72) Inventors: Raghubansh Bahadur Gupta, Bangalore (IN); Tushar Singh, Bangalore (IN); Prasanth Perugupalli, Cary, NC (US)

(73) Assignee: Pramana, Inc., Cambridge, MA (US)

( * ) Notice: Subject to any disclaimer, the term of this patent is extended or adjusted under 35 U.S.C. 154(b) by 0 days.

(21) Appl. No.: 19/457,605

(22) Filed: Jan. 23, 2026

(51) Int. Cl.

| | |
|---|---|
| ***G06T 5/94*** | (2024.01) |
| ***G02B 21/36*** | (2006.01) |
| ***G06T 5/60*** | (2024.01) |
| ***G06T 5/70*** | (2024.01) |
| ***G06T 7/00*** | (2017.01) |

(52) U.S. Cl.

CPC .............. *G06T 5/94* (2024.01); *G02B 21/367* (2013.01); *G06T 5/60* (2024.01); *G06T 5/70* (2024.01); *G06T 7/97* (2017.01); *G06T 2207/10056* (2013.01); *G06T 2207/20081* (2013.01); *G06T 2207/20084* (2013.01); *G06T 2207/20212* (2013.01)

(58) Field of Classification Search

CPC .... G06T 5/94; G06T 5/60; G06T 5/70; G06T 7/97; G06T 2207/10056; G06T 2207/20081; G06T 2207/20084; G06T 2207/20212; G02B 21/367

See application file for complete search history.

(56) References Cited

U.S. PATENT DOCUMENTS 7,256,799 B2 * 8/2007 Hatanaka ............... G09G 5/395 345/1.3

10,805,587 B1 * 10/2020 Wilfred .............. G06K 7/10722

(Continued)

FOREIGN PATENT DOCUMENTS

| | | | | |
|---|---|---|---|---|
| CN | 107197122 A | | 9/2017 | |
| CN | 118134818 B | * | 7/2024 | ............. G06N 3/084 |
| KR | 102255074 B1 | | 5/2021 | |

OTHER PUBLICATIONS

Piccinini, Filippo, et al. "Multi-image based method to correct vignetting effect in light microscopy images." Journal of microscopy 248.1 (2012): 6-22. (Year: 2012).*

(Continued)

*Primary Examiner* — Stephen R Koziol
*Assistant Examiner* — Joshua Chen
(74) *Attorney, Agent, or Firm* — CALDWELL LLC

(57) ABSTRACT

An apparatus and method for generating a synthetic image as a function of a slide image. The apparatus includes at least a processor and a memory communicatively connected to the at least a processor. The memory instructs the processor to determine an illumination profile of an image capturing system by capturing a sensor white image, receive a slide image of a plurality of slide images, identify a background area of the slide image, generate a synthetic slide white as a function of a comparison between the sensor white image and a slide white estimate, modify the slide image using the synthetic slide white to compensate for illumination non-uniformity within the slide image, and generate a synthetic image as a function of modifying the slide image.

18 Claims, 7 Drawing Sheets

(56) References Cited

U.S. PATENT DOCUMENTS

| | | | | |
|---|---|---|---|---|
| 12,375,614 | B2 * | 7/2025 | Feder | H04N 1/00167 |
| 2009/0175555 | A1 | 7/2009 | Mahowald | |
| 2014/0055592 | A1 * | 2/2014 | Wei | G02B 21/0064 348/79 |

OTHER PUBLICATIONS

Poon, Steven SS, et al. "Intensity calibration and automated cell cycle gating for high-throughput image-based siRNA screens of mammalian cells." Cytometry Part A: the journal of the International Society for Analytical Cytology 73.10 (2008): 904-917. (Year: 2008).*

Peng et al A BaSiC tool for background and shading correction of optical microscopy images Nature Communications vol. 8, Article No. 14836 (2017).

Smith et al CIDRE: an illumination-correction method for optical microscopy Nature Methods, 12(5):404-406.

Tak et al Simple Shading Correction Method for Brightfield Whole Slide Imaging "Sensors2020, 20(11), 3084".

* cited by examiner

APPARATUS FOR AND METHOD OF GENERATING A SYNTHETIC IMAGE AS A FUNCTION OF A SLIDE IMAGE

FIELD OF THE INVENTION

The present invention generally relates to the field of image processing. In particular, the present invention is directed to an apparatus for and a method of generating a synthetic image as a function of a slide image.

BACKGROUND

Imaging systems used to capture slide images often exhibit non-uniform illumination across the field of view due to optical path variations, sensor characteristics, and temporal changes in lighting conditions. Such illumination variability can introduce spatial intensity artifacts that obscure background regions and degrade the visual consistency and analytical reliability of captured slide images, particularly when multiple images are acquired and combined. These effects are further exacerbated in high-throughput or inline acquisition workflows, where illumination conditions may drift over time and manual recalibration is impractical.

SUMMARY OF THE DISCLOSURE

In an aspect, an apparatus for generating a synthetic image as a function of a slide image includes at least a processor and a memory communicatively connected to the at least a processor. The memory contains instructions configuring the processor to determine an illumination profile of an image capturing system by capturing a sensor white image, receive a slide image of a plurality of slide images, identify a background area of the slide image, generate a synthetic slide white as a function of a comparison between the sensor white image and a slide white estimate, wherein the slide white estimate is generated by filtering noise data from the slide image, extracting, using a machine learning model, one or more illumination characteristics from the filtered slide image as a function of the identified background area, and estimating spatial intensity variation across the slide image, modify the slide image using the synthetic slide white to compensate for illumination non-uniformity within the slide image, and generate a synthetic image as a function of modifying the slide image.

In another aspect, a method of generating a synthetic image as a function of a slide image includes determining, using at least a processor, an illumination profile of an image capturing system by capturing a sensor white image, receiving, using the at least a processor, a slide image of a plurality of slide images, identifying, using the at least a processor, a background area of the slide image, generating, using the at least a processor, a synthetic slide white as a function of a comparison between the sensor white image and a slide white estimate, wherein the slide white estimate is generated by filtering, using the at least a processor, noise data from the slide image, extracting, using a machine learning model, one or more illumination characteristics from the filtered slide image as a function of the identified background area, and estimating, using the at least a processor, spatial intensity variation across the slide image, modifying, using the at least a processor, the slide image using the synthetic slide white to compensate for illumination non-uniformity within the slide image, and generating, using the at least a processor, a synthetic image as a function of modifying the slide image.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

At a high level, aspects of the present disclosure are directed to apparatuses and methods for generating a synthetic image as a function of a slide image. An apparatus includes at least a computing device comprised of a processor and a memory communicatively connected to the processor. The memory instructs the processor to determine an illumination profile of an image capturing system by capturing a sensor white image. The processor receive a slide image of a plurality of slide images. The processor identifies a background area of the slide image. Additionally, the processor generates a synthetic slide white as a function of a comparison between the sensor white image and a slide white estimate, wherein the slide white estimate is generated by filtering noise data from the slide image, extracting, using a machine learning model, one or more illumination characteristics from the filtered slide image as a function of the identified background area, and estimating spatial intensity variation across the slide image. The processor modifies the slide image using the synthetic slide white to compensate for illumination non-uniformity within the slide image. The memory then instructs the processor to generate a synthetic image as a function of modifying the slide image.

Exemplary embodiments illustrating aspects of the present disclosure are described below in the context of several specific examples.

Figure 1:
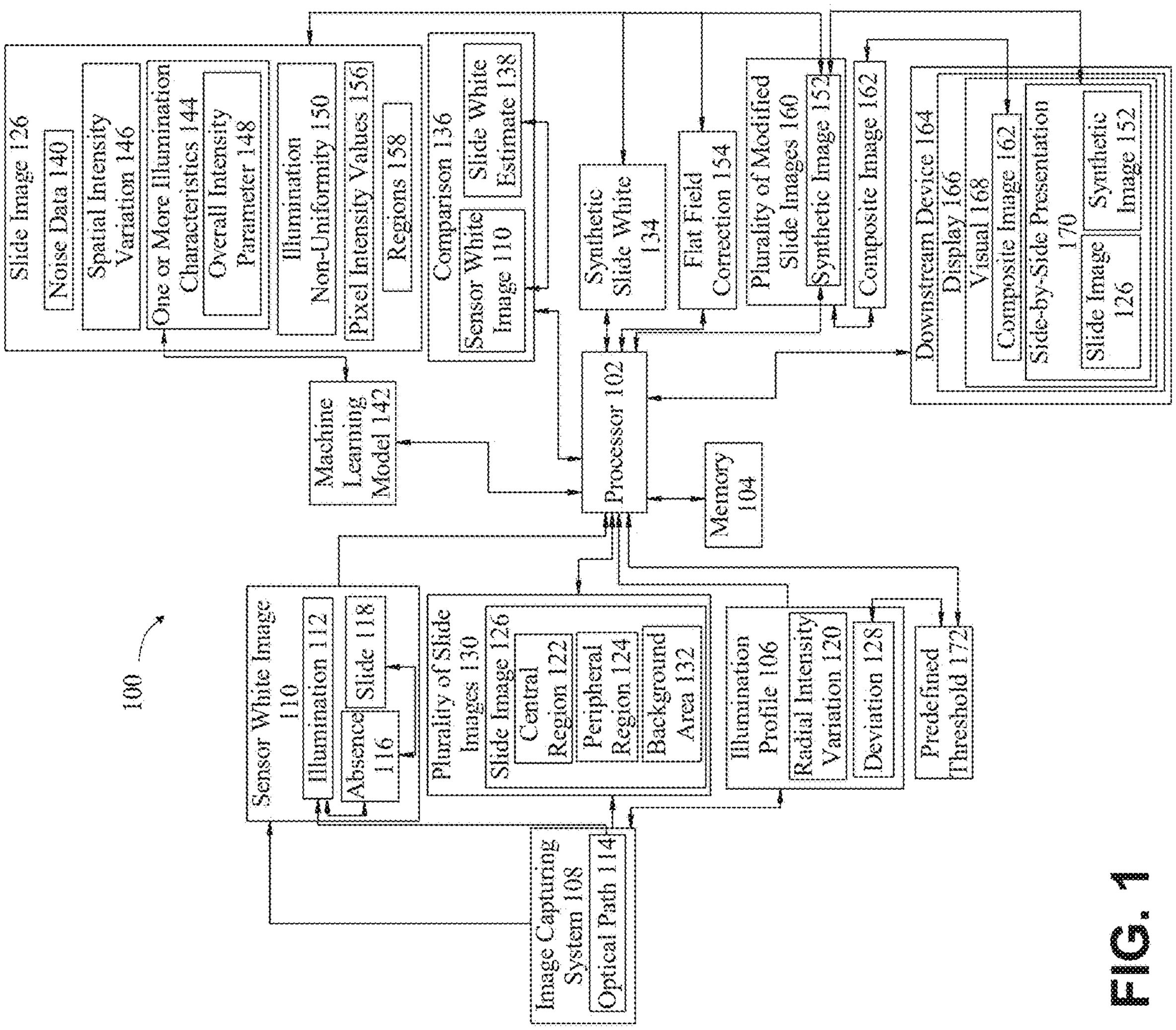
FIG. 1 is a block diagram of an apparatus for generating a synthetic image as a function of a slide image.

Referring now to FIG. 1, the apparatus 100 may include a system and method for performing illumination normalization and flat field correction 154 in a digital microscopy or whole slide imaging environment in a manner that reduces or eliminates reliance on per slide white reference images while still addressing optical artifacts arising from lens convexity, illumination drift, debris, and other imperfections. Without limitation, images captured by an upright microscope may exhibit a characteristic intensity profile in which a central region is brighter than peripheral regions 124 due to the convex nature of the optical elements, such that flat field or intensity correction is applied to normalize this profile and prevent visible seams, dips, or periodic striping artifacts when adjacent image tiles are stitched together. Rather than repeatedly capturing a slide white from nominally empty regions 158 of each physical slide, which may nevertheless contain tissue remnants, stain deposits, or debris and which may be inaccurately identified using low resolution macro images, the system may capture a scanner white image that represents illumination alone, obtained without a slide present so that uncontaminated light passing through the objective is recorded. In an embodiment, this scanner white may be captured continuously or periodically to characterize the intrinsic illumination condition of the optical path 114 and to enable detection of deviations caused by drift, contamination, or misalignment. Without limitation, the illumination profile 106 may be characterized using at least two parameters, including an overall intensity level and a radial intensity variation from the center toward the corners, which together describe the spatial behavior of the illumination 112. To derive a clean and artifact free reference, the system may apply frequency domain processing such as Fourier based analysis or alternatively machine learning or statistical techniques to identify and remove unwanted frequency components associated with debris, tissue fragments, stains, or noise, whether those components appear as high frequency sharp artifacts or low frequency smooth structures. Fourier based analysis may include transforming an illumination image into a spatial frequency domain, identifying frequency bands associated with non-illumination artifacts, selectively suppressing those components to recover a smooth radial intensity profile and global intensity level, and the like. Machine learning techniques may include supervised or unsupervised models trained on known clean illumination data to recognize and remove debris patterns, tissue fragments, or stain deposits while preserving the underlying illumination structure. Statistical techniques may include surface fitting, polynomial or spline modeling, principal component analysis, robust estimation methods that infer the illumination profile 106 by minimizing the influence of outliers and localized intensity variations, and the like. In another non-limiting example, these analytical techniques may operate individually or in combination, such that frequency domain filtering identifies candidate artifact regions 158 while machine learning models classify or refine those regions 158, and statistical modeling reconstructs a smooth illumination surface from the remaining data. This layered approach may improve reliability across diverse slide conditions, including archival slides where clean regions 158 are scarce, and improves flat field correction 154 performance by producing a synthetic white image that closely approximates an ideal slide white. The resulting improvement on technology includes enhanced stitching quality, reduced seam artifacts, earlier detection of optical drift, and more efficient scanning workflows through conditional recalibration rather than routine slide based correction. Based on this filtering, a synthetic white image may be generated that preserves the correct illumination intensity and radial profile while excluding slide dependent artifacts, thereby serving as a functional equivalent of an ideal slide white captured from a perfectly clean slide. This synthetic white may then be used for flat field correction 154 across multiple slides, improving consistency and reducing acquisition time. Without limitation, the system may monitor scanner white images over time to identify deviations relative to prior baselines, such that a need to recapture scanner white or, in limited circumstances, to capture an actual slide white is triggered only when predefined thresholds are exceeded. Without limitation, by conditionally invoking slide based calibration rather than performing it routinely, the approach may increase throughput, reduce workflow interruptions, and maintain robust illumination correction even in archival or non-clinical environments where clean slides are uncommon. Collectively, these features may provide a slide 118 independent, automated, and reproducible illumination normalization framework that may improve stitched image quality, minimize seam artifacts, and enhance overall robustness of digital microscopy systems. In this disclosure, the terms apparatus 100 and system may be used interchangeably to refer to the same structural and functional components unless the context clearly indicates otherwise.

With continued reference to FIG. 1, in a non-limiting example, the system herein may represent an improvement on technology for illumination normalization and flat field correction 154 in digital microscopy and whole slide imaging because it reduces dependence on per slide white reference images while increasing robustness, consistency, and throughput. This improvement is realized because conventional systems rely on repeated capture of slide white images that are highly dependent on the physical condition of individual slides, which often contain debris, stains, tissue remnants, or other artifacts that degrade correction accuracy and introduce stitching seams or intensity banding. The system herein improves this technological landscape through use of scanner white images that represent illumination 112 alone and through generation of a synthetic white image using frequency domain, machine learning, or statistical processing, thereby isolating intrinsic optical behavior from slide induced contamination. In this non-limiting example, the improvement may further include characterization of illumination 112 using overall intensity and radial intensity variation 120 parameters and intelligent filtering of unwanted frequency components corresponding to noise, debris, or sample structures. This approach may improve flat field correction 154 accuracy because it yields a clean and repeatable illumination profile 106 that is functionally equivalent to an ideal slide white obtained from a perfectly clean slide, even in environments where such slides are rarely available. The resulting synthetic white image may improve image stitching quality through reduction of visible seams, periodic patterns, and edge darkening artifacts that commonly arise from lens convexity and illumination drift. Without limitation, the system herein may provide an improvement through continuous or periodic monitoring of scanner white images to detect optical drift, contamination, or hardware changes and through triggering slide based calibration only when deviations exceed defined thresholds. This conditional calibration logic may improve workflow efficiency through reduction of unnecessary recalibration steps, lowering of scan time, and increased throughput, while simultaneously improving system stability and long term correction performance. Collectively, these features may constitute an improvement on technology by delivering slide independent, automated, and reproducible illumination normalization that enhances image quality, operational efficiency, and robustness across diverse clinical and archival scanning conditions.

With continued reference to FIG. 1, an exemplary embodiment of apparatus 100 for generating a synthetic image 152 as a function of a slide image 126 is illustrated. Apparatus 100 may include a processor 102 communicatively connected to a memory 104. As used in this disclosure, "communicatively connected" means connected by way of a connection, attachment, or linkage between two or more relata which allows for reception and/or transmittance of information therebetween. For example, and without limitation, this connection may be wired or wireless, direct or indirect, and between two or more components, circuits, devices, systems, and the like, which allows for reception and/or transmittance of data and/or signal(s) therebetween. Data and/or signals there between may include, without limitation, electrical, electromagnetic, magnetic, video, audio, radio and microwave data and/or signals, combinations thereof, and the like, among others. A communicative connection may be achieved, for example and without limitation, through wired or wireless electronic, digital or analog, communication, either directly or by way of one or more intervening devices or components. Further, communicative connection may include electrically coupling or connecting at least an output of one device, component, or circuit to at least an input of another device, component, or circuit. For example, and without limitation, via a bus or other facility for intercommunication between elements of a computing device. Communicative connecting may also include indirect connections via, for example and without limitation, wireless connection, radio communication, low power wide area network, optical communication, magnetic, capacitive, or optical coupling, and the like. In some instances, the terminology "communicatively coupled" may be used in place of communicatively connected in this disclosure.

With continued reference to FIG. 1, memory 104 may include a primary memory and a secondary memory. "Primary memory" also known as "random access memory" (RAM) for the purposes of this disclosure is a short-term storage device in which information is processed. In one or more embodiments, during use of the computing device, instructions and/or information may be transmitted to primary memory wherein information may be processed. In one or more embodiments, information may only be populated within primary memory while a particular software is running. In one or more embodiments, information within primary memory is wiped and/or removed after the computing device has been turned off and/or use of a software has been terminated. In one or more embodiments, primary memory may be referred to as "Volatile memory" wherein the volatile memory only holds information while data is being used and/or processed. In one or more embodiments, volatile memory may lose information after a loss of power. "Secondary memory" also known as "storage," "hard disk drive" and the like for the purposes of this disclosure is a long-term storage device in which an operating system and other information is stored. In one or remote embodiments, information may be retrieved from secondary memory and transmitted to primary memory during use. In one or more embodiments, secondary memory may be referred to as non-volatile memory wherein information is preserved even during a loss of power. In one or more embodiments, data within secondary memory cannot be accessed by processor 102. In one or more embodiments, data is transferred from secondary to primary memory wherein processor 102 may access the information from primary memory.

Still referring to FIG. 1, apparatus 100 may include a database. The database may include a remote database. The database may be implemented, without limitation, as a relational database, a key-value retrieval database such as a NOSQL database, or any other format or structure for use as database that a person skilled in the art would recognize as suitable upon review of the entirety of this disclosure. The database may alternatively or additionally be implemented using a distributed data storage protocol and/or data structure, such as a distributed hash table or the like. The database may include a plurality of data entries and/or records as described above. Data entries in database may be flagged with or linked to one or more additional elements of information, which may be reflected in data entry cells and/or in linked tables such as tables related by one or more indices in a relational database. Persons skilled in the art, upon reviewing the entirety of this disclosure, will be aware of various ways in which data entries in database may store, retrieve, organize, and/or reflect data and/or records.

With continued reference to FIG. 1, apparatus 100 may include and/or be communicatively connected to a server, such as but not limited to, a remote server, a cloud server, a network server and the like. In one or more embodiments, the computing device may be configured to transmit one or more processes to be executed by server. In one or more embodiments, server may contain additional and/or increased processor power wherein one or more processes as described below may be performed by server. For example, and without limitation, one or more processes associated with machine learning may be performed by network server, wherein data is transmitted to server, processed and transmitted back to computing device. In one or more embodiments, server may be configured to perform one or more processes as described below to allow for increased computational power and/or decreased power usage by the apparatus computing device. In one or more embodiments, computing device may transmit processes to server wherein computing device may conserve power or energy.

Further referring to FIG. 1, apparatus 100 may include any "computing device" as described in this disclosure, including without limitation a microcontroller, microprocessor, digital signal processor (DSP) and/or system on a chip (SoC) as described in this disclosure. Apparatus 100 may include, be included in, and/or communicate with a mobile device such as a mobile telephone or smartphone. Apparatus 100 may include a single computing device operating independently, or may include two or more computing devices operating in concert, in parallel, sequentially or the like; two or more computing devices may be included together in a single computing device or in two or more computing devices. Apparatus 100 may interface or communicate with one or more additional devices as described below in further detail via a network interface device. Network interface device may be utilized for connecting processor 102 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. Processor 102 may include but is not limited to, for example, a computing device or cluster of computing devices in a first location and a second computing device or cluster of computing devices in a second location. Apparatus 100 may include one or more computing devices dedicated to data storage, security, distribution of traffic for load balancing, and the like. Apparatus 100 may distribute one or more computing tasks as described below across a plurality of computing devices of computing device, which may operate in parallel, in series, redundantly, or in any other manner used for distribution of tasks or memory between computing devices. Apparatus 100 may be implemented, as a non-limiting example, using a "shared nothing" architecture.

With continued reference to FIG. 1, processor 102 may be designed and/or configured to perform any method, method step, or sequence of method steps in any embodiment described in this disclosure, in any order and with any degree of repetition. For instance, processor 102 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Processor 102 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Still referring to FIG. 1, processor 102 is configured to determine an illumination profile 106 of an image capturing system 108 by capturing a sensor white image 110. As used in this disclosure, "illumination profile" is a representation of spatial and intensity characteristics of illumination 112 produced by an image capturing system 108. In an embodiment, the illumination profile 106 may describe how illumination intensity varies across a field of view from a central region 122 toward peripheral regions 124. In a non-limiting example, the illumination profile 106 may be used to correct nonuniform brightness caused by optical geometry or illumination source behavior. Without limitation, the illumination profile 106 may be derived from one or more reference images and used to normalize subsequently captured images. As used in this disclosure, "image capturing system" is an apparatus configured to acquire image data using optical components, an illumination source, and at least one sensor. In an embodiment, the image capturing system 108 may include a microscope, a camera, a controlled illumination path, and the like. In a non-limiting example, the image capturing system 108 may operate with or without a physical sample positioned in the optical path 114. Without limitation, the image capturing system 108 may be configured to capture reference images and sample images for further processing by a processor 102. As used in this disclosure, "sensor white image" is an image captured by an image capturing system 108 that represents illumination at a sensor in the absence 116 of a sample. In an embodiment, the sensor white image 110 may be captured with no slide or specimen present in the optical path 114. In a non-limiting example, the sensor white image 110 may be used to characterize illumination behavior of the image capturing system 108 over time. For example, without limitation, the sensor white image 110 may be analyzed by a processor 102 to determine an illumination profile 106 for image normalization.

With continued reference to FIG. 1, in a non-limiting example, the processor 102 may determine the illumination profile 106 using spatial surface fitting applied to a sensor white image 110, such as fitting a two dimensional polynomial surface across the full field of view. In an embodiment, pixel intensities from the sensor white image 110 may be sampled on a grid and used to compute a best fit surface that represents gradual illumination falloff from the center toward the edges. For example, without limitation, the resulting fitted surface may be stored as the illumination profile 106 and later used to normalize sample images captured by the image capturing system 108. In another non-limiting example, the processor 102 may determine the illumination profile 106 using Fourier based frequency filtering of the sensor white image 110. In an embodiment, the sensor white image 110 may be converted into a spatial frequency representation and high frequency components associated with sensor noise or small defects may be removed. Without limitation, the remaining low frequency components may be transformed back into the spatial domain to produce a smooth illumination profile 106 that reflects lens induced and source induced intensity variation. In a further non-limiting example, the processor 102 may determine the illumination profile 106 using a trained machine learning model 142 such as a convolutional neural network. Without limitation, the machine learning model 142 may be configured in accordance with the machine learning model(s) in FIG. 3. In an embodiment, the model may be trained using labeled sensor white images collected under controlled illumination 112 conditions so that the model learns to predict illumination intensity maps. For example, without limitation, the processor 102 may input a newly captured sensor white image 110 into the model and receive an estimated illumination profile 106 that excludes artifacts and noise. In another non-limiting example, the processor 102 may determine the illumination profile 106 using statistical aggregation and robust estimation techniques. In an embodiment, the processor 102 may compute median or percentile based intensity values across local regions 158 of the sensor white image 110 to suppress outliers. Without limitation, these aggregated values may be interpolated to generate a smooth illumination profile 106 that reflects overall illumination 112 behavior while ignoring localized anomalies. In still another non-limiting example, the processor 102 may determine the illumination profile 106 using temporal averaging across multiple sensor white images captured at different times. In an embodiment, the processor 102 may align and average a sequence of sensor white images to reduce random noise and transient artifacts. For example, without limitation, the resulting averaged image may serve as the illumination profile 106 and may be periodically updated to track gradual changes in illumination 112 output or optical path 114 condition.

With continued reference to FIG. 1, the sensor white image 110 may represent illumination 112 transmitted through an optical path 114 of the image capturing system 108 in an absence 116 of a slide 118. As used in this disclosure, "illumination" is light generated by an illumination 112 source and propagated within an image capturing system 108. Without limitation, the illumination 112 may be for the purpose of forming image data at a sensor. In an embodiment, illumination 112 may originate from one or more light emitting elements and be directed toward a sensor through optical components. In a non-limiting example, illumination 112 may vary in intensity or spatial distribution due to characteristics of the illumination source or system configuration. Without limitation, illumination 112 may be monitored or characterized to support image normalization and correction operations. As used in this disclosure, "optical path" is a defined physical route through which illumination 112 travels within an image capturing system 108 between an illumination source and a sensor. In an embodiment, the optical path 114 may include lenses, apertures, filters, mirrors, or other optical elements that shape or direct illumination 112. In a non-limiting example, changes within the optical path 114 may affect illumination 112 intensity or uniformity at the sensor. Without limitation, the optical path 114 may be evaluated to detect drift, contamination, or misalignment. As used in this disclosure, "slide" is a physical substrate configured to support a sample for imaging within an image capturing system 108. In an embodiment, the slide may be formed of glass, another optically transmissive material, and the like. In a non-limiting example, the slide may carry biological tissue, stains, or other materials that interact with illumination 112. Without limitation, the slide may be absent when capturing a sensor white image 110 to isolate illumination characteristics 144 of the image capturing system 108. In a non-limiting example, the sensor white image 110 may represent illumination 112 that propagates from an illumination source of the image capturing system 108, passes through the optical path 114, and is received directly at a sensor when no slide is present in the system. In an embodiment, the optical path 114 may include one or more lenses, apertures, objectives, filters, or other optical components that shape, focus, or direct the illumination 112 prior to reaching the sensor. In the absence 116 of a slide 118, the captured sensor white image 110 therefore may reflect illumination 112 behavior that is intrinsic to the image capturing system 108 itself rather than influenced by sample related absorption, scattering, staining, or debris. In another non-limiting example, capturing the sensor white image 110 without a slide 118 may allow the processor 102 to observe spatial nonuniformities, intensity gradients, and optical asymmetries that arise from the illumination source, optical alignment, or component geometry within the optical path 114. In an embodiment, these characteristics may include center brightening, edge darkening, and/or other systematic intensity variations caused by lens curvature or illumination 112 coupling. Without limitation, the sensor white image 110 may be used as a reference representation of how illumination 112 is delivered to the sensor under baseline conditions. Without limitation, the sensor white image 110 may be captured repeatedly or periodically to monitor changes in illumination 112 transmitted through the optical path 114 over time. In a non-limiting example, the sensor white image 110 may be captured at predefined time intervals during operation of the image capturing system 108, such as once per scanning session, once per hour, or once per day, to monitor stability of illumination 112 transmitted through the optical path 114. In an embodiment, these periodic captures may be scheduled automatically by a processor 102 based on elapsed time or system usage metrics. Without limitation, comparing sensor white images captured at different intervals may allow detection of gradual illumination drift or degradation. In another non-limiting example, the sensor white image 110 may be captured in response to specific operational events within the image capturing system 108. In an embodiment, a sensor white image 110 may be captured after system startup, after completion of a predefined number of slide scans, or after a change in illumination settings. Without limitation, this event driven capture may provide updated illumination 112 information following conditions that are likely to affect optical performance. In still another non-limiting example, the sensor white image 110 may be captured continuously or near continuously during idle periods when no slide is present. In an embodiment, the image capturing system 108 may acquire a sequence of sensor white images and analyze trends across the sequence to identify short term fluctuations or sudden deviations in illumination 112. Without limitation, this continuous monitoring approach may enable early detection of contamination, component misalignment, or illumination source instability within the optical path 114. In an embodiment, variations between sensor white images may indicate drift in the illumination source, accumulation of contaminants within the optical path 114, or changes in optical component performance. Without limitation, the processor 102 may use the sensor white image 110 to determine or update an illumination profile 106 of the image capturing system 108 and to support normalization or correction of subsequently captured sample images.

With continued reference to FIG. 1, the illumination profile 106 may include a radial intensity variation 120 extending from a central region 122 of the slide image 126 toward peripheral regions 124 of the slide image 126. As used in this disclosure, "radial intensity variation" is a change in illumination intensity as a function of distance from a central location within an image. In an embodiment, radial intensity variation 120 may describe a gradual decrease in intensity moving outward from a center of an image. In a non-limiting example, radial intensity variation 120 may result from optical lens geometry that produces higher illumination 112 near the center than near edges. Without limitation, radial intensity variation 120 may be quantified and incorporated into an illumination profile 106 for image normalization. In a non-limiting example, radial intensity variation 120 may be quantified by measuring illumination intensity values at multiple locations located at increasing distances from a central region 122 of an image. In an embodiment, the processor 102 may define a series of concentric regions 158 centered on the geometric center of the image and compute an average intensity value for each region. Without limitation, the resulting set of intensity values may form a radial intensity curve that represents how illumination 112 changes from the center toward peripheral regions 124. In another non-limiting example, radial intensity variation 120 may be quantified by fitting a mathematical model to intensity measurements extracted along radial directions extending outward from the central region 122. In an embodiment, the processor 102 may fit a polynomial, spline, or other smooth function to represent the relationship between radial distance and intensity. Without limitation, parameters of the fitted model may be stored as part of the illumination profile 106 and used during image normalization. In another non-limiting example, radial intensity variation 120 may be incorporated into the illumination profile 106 by generating a spatial correction map that compensates for measured intensity falloff. In an embodiment, the processor 102 may compute a normalization factor for each pixel based on its radial position relative to the central region 122. Without limitation, applying the normalization factors to subsequently captured slide images 130 may reduce center brightening and edge darkening and produce a more uniform normalized image. As used in this disclosure, "central region" is a portion of an image located proximate to a geometric center of a field of view. In an embodiment, the central region 122 may correspond to an area aligned with an optical axis of an image capturing system 108. In a non-limiting example, the central region 122 may exhibit higher illumination 112 intensity relative to other regions 158 of the image. Without limitation, the central region 122 may be used as a reference point for measuring spatial illumination changes. As used in this disclosure, "peripheral region" is a portion of an image located away from a central region 122 and closer to one or more edges of a field of view. In an embodiment, peripheral regions 124 may surround the central region 122 and extend toward image boundaries. In a non-limiting example, peripheral regions 124 may exhibit reduced illumination intensity due to optical falloff or vignetting effects. Without limitation, peripheral regions 124 may be evaluated relative to the central region 122 to characterize radial intensity variation 120. In a non-limiting example, the illumination profile 106 of a slide image 126 may include a radial intensity variation 120 that originates at the central region 122 of the slide image 126 and extends outward toward peripheral regions 124. In an embodiment, this variation may appear as a smooth decrease in brightness from the center of the slide image 126 toward its edges. Without limitation, the illumination profile 106 may use this radial intensity variation 120 to correct center brightening and edge darkening effects across the slide image 126.

With continued reference to FIG. 1, the at least a processor 102 may be further configured to detect a deviation in the illumination profile 106 based on a threshold 172 and selectively trigger capture of the slide white in response to the detected deviation. As used in this disclosure, "deviation" is a measurable difference between two or more values associated with a characteristic of an illumination profile 106. In an embodiment, a deviation 128 may correspond to a change in overall illumination intensity between two measurements. In a non-limiting example, a deviation 128 may correspond to a change in a radial intensity distribution across an image field. Without limitation, a deviation 128 may be computed by comparing a current illumination profile 106 with a previously stored illumination profile 106. In a non-limiting example, the deviation 128 may be a change in overall illumination intensity measured between a current illumination profile 106 and a previously stored illumination profile 106, such as a five percent decrease in average pixel intensity across a sensor white image 110. In an embodiment, the processor 102 may compute a mean intensity value from the current sensor white image and compare it to a baseline mean intensity value to determine the deviation 128. Without limitation, this type of deviation 128 may indicate aging or reduced output of an illumination source. In another non-limiting example, the deviation 128 may be a change in radial intensity variation 120, such as increased edge darkening relative to a central region 122 when compared to a reference illumination profile 106. In an embodiment, the processor 102 may compute a difference between radial intensity curves derived from current and reference sensor white images. Without limitation, an increase in intensity drop from the central region 122 to peripheral regions 124 may indicate optical misalignment or vignetting changes. In still another non-limiting example, the deviation 128 may be a localized intensity change within a portion of the field of view, such as the appearance of a dim region or asymmetric brightness pattern not present in a baseline illumination profile 106. In an embodiment, the processor 102 may detect such deviation 128 by comparing spatial intensity maps and identifying regions 158 where intensity differences exceed a threshold 172. Without limitation, the deviation 128 may correspond to contamination, partial occlusion, or damage within the optical path 114 that affects illumination 112 transmission.

With continued reference to FIG. 1, as used in this disclosure, "predefined threshold" is a predetermined limit used to determine whether a deviation 128 is significant. In an embodiment, a threshold 172 may be stored in memory 104 and selected based on acceptable illumination stability criteria. In a non-limiting example, the threshold 172 may correspond to a maximum allowable change in intensity or spatial uniformity. Without limitation, exceeding the threshold 172 may indicate that recalibration or corrective action is required. In a non-limiting example, the threshold 172 may be defined as a numeric limit corresponding to a change of 5 percent in overall illumination intensity between a current illumination profile 106 and a reference illumination profile 106. In an embodiment, if an average pixel intensity derived from a sensor white image 110 changes by more than 5 percent relative to a stored baseline value, the processor 102 may identify this change as a deviation. Without limitation, exceeding the 5 percent threshold 172 may trigger capture of a slide white image for recalibration. In another non-limiting example, the threshold 172 may be defined as a maximum allowable change of 10 percent in radial intensity variation 120 between a central region 122 and one or more peripheral regions 124 of an image. In an embodiment, the processor 102 may compute a ratio between central region 122 intensity and peripheral region intensity and compare the ratio to a stored reference ratio. Without limitation, a change in the ratio exceeding 10 percent may indicate unacceptable illumination nonuniformity. In another non-limiting example, the threshold 172 may be defined as an absolute intensity difference of 20 grayscale levels on an 8 bit intensity scale between corresponding regions 158 of two illumination profiles. In an embodiment, the processor 102 may compare pixel or region based intensity values and flag a deviation when the difference exceeds 20 grayscale levels. Without limitation, use of a numeric threshold of this type may allow precise control over when slide white capture is selectively triggered. In a non-limiting example, a processor 102 may be configured to compare a current illumination profile 106 with a reference illumination profile 106 to detect a deviation represented by a deviation 128 that exceeds the threshold 172. In an embodiment, the processor 102 may evaluate changes in global intensity, radial intensity variation 120, or both to determine whether illumination 112 behavior has shifted beyond acceptable limits. Without limitation, when the detected deviation exceeds the threshold 172, the processor 102 may selectively trigger capture of a slide white image so that illumination calibration is updated only when system behavior indicates that such capture is necessary. In another non-limiting example, selective triggering of slide white capture may occur after detection of illumination drift caused by aging of an illumination source or accumulation of contaminants within an optical path 114. In an embodiment, the processor 102 may continue normal image acquisition when variations remain below the threshold 172 and may initiate slide white capture only upon detecting a significant deviation. Without limitation, this selective triggering approach may reduce unnecessary calibration operations while maintaining accurate illumination normalization for slide imaging.

With continued reference to FIG. 1, in a non-limiting example, the system may implement automatic deviation detection and triggering logic by continuously or periodically monitoring sensor white images captured over time. In an embodiment, the system may store a sequence of sensor white images and corresponding illumination profiles in memory 104 and compare newly captured sensor white images against previously stored reference images. Without limitation, changes in overall intensity, spatial uniformity, or radial intensity variation 120 across successive sensor white images may be evaluated to identify trends that indicate illumination drift or gradual degradation of illumination 112 output. In another non-limiting example, the system may monitor differences between a generated synthetic white image and an expected illumination representation derived from a reference illumination profile 106. In an embodiment, the processor 102 may compute pixel wise or region based differences between the synthetic white image and an expected illumination map and quantify the magnitude of those differences. Without limitation, persistent or increasing differences may indicate changes in the optical path 114, such as partial occlusion, contamination of optical elements, or misalignment of illumination components. In another non-limiting example, the system may compare detected variations against one or more predefined thresholds to determine whether a deviation is significant. In an embodiment, thresholds may be defined for changes in average intensity, radial intensity variation 120, or localized spatial patterns. Without limitation, when one or more thresholds are exceeded, the system may identify the deviation as indicative of optical drift, hardware modification, or contamination and may selectively trigger corrective actions such as capturing a new slide white image, updating the illumination profile 106, or initiating recalibration procedures.

With continued reference to FIG. 1, the processor 102 may determine whether a detected difference constitutes a deviation by comparing the computed difference values against one or more predefined thresholds. In an embodiment, the predefined thresholds may include a five percent change in average illumination intensity, a ten percent change in radial intensity variation 120 between a central region 122 and peripheral regions 124, or an absolute difference of twenty grayscale levels in localized regions 158. Without limitation, exceeding any of these predefined thresholds may cause the processor 102 to classify the change as a deviation in the illumination profile 106. Continuing, upon detecting a deviation that exceeds the predefined threshold, the processor 102 may selectively trigger capture of a slide white image to recalibrate illumination correction. In an embodiment, this triggering may occur only after determining that the deviation cannot be adequately corrected using updated sensor white information alone. Without limitation, the selective triggering ensures that slide white capture is performed only when illumination behavior has changed beyond acceptable limits, thereby reducing routine dependency on slide white capture while maintaining accurate calibration of the image capturing system 108.

Still referring to FIG. 1, processor 102 is configured to receive a slide image 126 of a plurality of slide images 130. As used in this disclosure, "slide image" is an image captured by an image capturing system 108 that represents at least a portion of a slide 118 positioned in the optical path 114. In an embodiment, a slide image 126 may include image data corresponding to a biological sample, tissue section, or other material supported by the slide. In a non-limiting example, a plurality of slide images 130 may be captured at different locations across the slide to form a larger composite image 162. Without limitation, slide images 130 may be processed using illumination normalization, stitching, or other image processing operations performed by a processor 102. In a non-limiting example, the processor 102 may be configured to receive hundreds of slide images 130 corresponding to different regions 158 of a single slide. In an embodiment, the image capturing system 108 may divide the slide into a grid and capture a slide image 126 at each grid location, such that the processor 102 sequentially receives slide images 130 as scanning progresses. Without limitation, these slide images 130 may later be combined to form a composite slide representation. In another non-limiting example, the processor 102 may be configured to receive thousands of slide images 130 captured at high magnification across the slide. In an embodiment, each slide image 126 may correspond to a tile having dimensions of a few hundred micrometers, and a large number of tiles may be required to cover the full slide area. Without limitation, the processor 102 may receive these slide images 130 in real time as they are captured by the image capturing system 108. In still another non-limiting example, the processor 102 may be configured to receive tens of thousands of slide images 130 when multiple focal planes or imaging modalities are used. In an embodiment, the image capturing system 108 may capture multiple slide images 130 at different focus depths or illumination settings for each spatial location on the slide. Without limitation, the processor 102 may receive and manage this plurality of slide images 130 for subsequent normalization, analysis, and stitching operations. In a non-limiting example, the processor 102 may receive slide images 130 through a direct sensor interface that transfers image data from an image sensor to the processor 102 via a high speed data bus. In an embodiment, the image capturing system 108 may use interfaces such as Camera Link, USB, Ethernet, or PCI Express to stream slide images 130 as they are captured. Without limitation, this approach may enable real time reception of slide images 130 during continuous slide scanning. In another non-limiting example, the processor 102 may receive slide images 130 through a memory 104 based buffering system. In an embodiment, slide images 130 may be temporarily stored in local memory, such as random access memory or nonvolatile memory, before being accessed by the processor 102. Without limitation, this approach may allow asynchronous image capture and processing, reduce latency and manage data flow during high throughput scanning. In a further non-limiting example, the processor 102 may receive slide images 130 via a network interface from a remote image capturing system 108. In an embodiment, slide images 130 may be transmitted over a local area network or wide area network using wired or wireless communication protocols. Without limitation, this configuration may support distributed imaging systems or remote slide acquisition. In another non-limiting example, the processor 102 may receive slide images 130 through a file based input mechanism. In an embodiment, slide images 130 may be written to storage as image files in standardized formats and later read by the processor 102. Without limitation, this approach may support batch processing or offline analysis of slide images 130. In another non-limiting example, the processor 102 may receive slide images 130 using a pipeline architecture integrated with image processing hardware. In an embodiment, image data may be passed through one or more hardware accelerators, such as graphics processing units or field programmable gate arrays, before being received by the processor 102. Without limitation, this approach may improve throughput and reduce processing latency for large numbers of slide images 130.

Still referring to FIG. 1, processor 102 is configured to identify a background area 132 of the slide image 126. As used in this disclosure, "background area" is a region of a slide image 126 that primarily represents a substrate or empty field. As used in this disclosure, "primarily" means mainly, chiefly, or for the most part, while not excluding the presence of additional, secondary, or incidental elements. In an embodiment, something that primarily represents a particular characteristic may include other characteristics, provided that the identified characteristic predominates or is the principal feature. For example, a background area 132 that primarily represents a substrate may include a small number of isolated pixels or artifacts, such as less than 10% of the area containing dust, scanner noise, or stray staining, while more than 90% of the area visually corresponds to the substrate rather than sample material. In an embodiment, the background area 132 may does not include sample material. In an embodiment, the background area 132 may correspond to a portion of a slide image 126 where no, or substantially no, tissue, stain, or specimen is present. As used in this disclosure, "substantially" means largely but not necessarily entirely, allowing for minor variations, deviations, or imperfections that do not materially affect the relevant function, purpose, or outcome. In an embodiment, a condition described as substantially absent, substantially no, or substantially free permits the presence of negligible or incidental amounts that would be understood by a person of ordinary skill in the art to have no meaningful impact. For example, a background area 132 that primarily represents a substrate may include a small number of isolated pixels or artifacts, such as less than 10% of the area containing dust, scanner noise, or stray staining, while more than 90% of the area visually corresponds to the substrate rather than sample material. In a non-limiting example, the background area 132 may exhibit relatively uniform intensity and color compared to regions 158 containing sample structures. Without limitation, the background area 132 may be used as a reference region for illumination analysis or normalization. In a non-limiting example, the processor 102 may identify the background area 132 by analyzing pixel intensity values 156 across the slide image 126 to locate regions 158 having minimal texture, low variance, or intensity levels consistent with an uncovered slide substrate. In an embodiment, regions 158 with uniform brightness and limited spatial variation may be classified as background areas. Without limitation, this identification may occur on a per image basis or across multiple slide images 130. In another non-limiting example, the processor 102 may identify the background area 132 using threshold based segmentation techniques. In an embodiment, pixel intensities may be compared against predefined intensity thresholds to separate sample regions 158 from non-sample regions 158. Without limitation, connected regions 158 that fall within the threshold range and exceed a minimum area size may be identified as background areas. In another non-limiting example, the processor 102 may identify the background area 132 using machine learning based classification techniques. In an embodiment, a trained model may analyze texture, intensity, and color features of the slide image 126 to distinguish background areas from sample containing areas. Without limitation, the model may be trained using labeled slide images 130 that include known background and sample regions 158. In another non-limiting example, the processor 102 may identify the background area 132 using multi resolution analysis. In an embodiment, a low magnification or macro image of the slide may be analyzed to locate candidate background regions 158, which may then be refined using higher resolution slide images 130. Without limitation, combining information across resolutions may improve robustness of background area 132 identification in slides containing debris, stains, or uneven sample distribution.

Still referring to FIG. 1, processor 102 is configured to generate a synthetic slide white 134 as a function of a comparison 136 between the sensor white image 110 and a slide white estimate 138, wherein the slide white estimate 138 is generated by filtering noise data 140 from the slide image 126, extracting, using a machine learning model 142, one or more illumination characteristics 144 from the filtered slide image 126 as a function of the identified background area 132, and estimating spatial intensity variation 146 across the slide image 126. As used in this disclosure, "synthetic slide white" is a generated reference representation corresponding to an idealized, artifact-free illumination profile 106 that would be obtained from a perfectly clean slide under given imaging conditions. The synthetic slide white 134 may model the expected white response absent noise, contamination, sample material, or sensor artifacts, and may serve as a computational substitute for a physically captured clean-slide reference. As used in this disclosure, "comparison" is an evaluation that determines a relationship between two data representations. In an embodiment, the comparison 136 may include pixel-wise analysis, statistical assessment, feature-based evaluation, or model-based alignment, and may not require exact equivalence. As used in this disclosure, "slide white estimate" is an estimated representation of the illumination profile 106 of a slide image 126 derived from background regions 158 of the slide image 126 itself. The slide white estimate 138 approximates the white response of the slide while accounting for imaging conditions and is refined through computational processing rather than direct measurement. As used in this disclosure, "noise data" is image data that does not represent true illumination or slide characteristics. Without limitation, the noise data 140 may arise from sensor noise, electronic interference, optical artifacts, dust, debris, random signal fluctuations, and the like. Noise data 140 may be spatially distributed or localized and may vary across the slide image 126. As used in this disclosure, "illumination characteristics" are parameters describing properties of the illumination used during slide imaging. Illumination characteristics 144 may include spatial intensity distribution, color or spectral response, vignetting behavior, gradients, or other non-uniform lighting effects present across the slide image 126. As used in this disclosure, "spatial intensity variation" is a non-uniform distribution of illumination intensity across different spatial regions 158 of a slide image 126. Spatial intensity variation 146 may manifest as gradual gradients, localized deviations, or systematic patterns resulting from illumination optics, sensor response, or slide positioning. In an embodiment, processor 102 may be configured to generate a synthetic slide white 134 corresponding to the idealized, artifact-free illumination profile 106 that would be obtained from a perfectly clean slide by performing a comparison 136 between a sensor white image 110 and a slide white estimate

138. The slide white estimate 138 is generated by filtering noise data 140 from the slide image 126, extracting, using a machine learning model 142, one or more illumination characteristics 144 from the filtered slide image 126 as a function of an identified background area 132, and estimating spatial intensity variation 146 across the slide image 126. In an embodiment, the slide white estimate 138 is generated through a multi-stage process applied to the slide image 126. First, noise data 140 is filtered from the slide image 126 to suppress signal components that do not represent true illumination behavior, including sensor noise, random fluctuations, and image artifacts. This filtering step may produce a filtered slide image 126 that more accurately reflects underlying illumination conditions. Next, one or more background areas are identified within the filtered slide image 126, where the background areas primarily represent substrate rather than sample material. Using a machine learning model 142, one or more illumination characteristics 144 are extracted from the filtered slide image 126 as a function of the identified background area 132. The machine learning model 142 may be trained to infer illumination-related features while discounting residual sample content, thereby isolating lighting behavior independent of tissue or stain. In an embodiment, the machine learning model 142 may be configured to extract illumination characteristics 144 from the filtered slide image 126 based on one or more identified background areas. The machine learning model 142 may include, in a non-limiting example, a convolutional neural network, an autoencoder, a regression model, a probabilistic graphical model, or an ensemble of models configured to learn spatial and intensity-based illumination patterns from image data. In an embodiment, the machine learning model 142 may be trained using supervised learning, semi-supervised learning, weakly supervised learning, self-supervised learning, and the like. In a supervised training example, the model may be trained using labeled training data comprising slide images 130 or image patches in which background areas are annotated and associated with known illumination characteristics 144 or reference illumination profiles. The labels may indicate expected white intensity values, spatial illumination gradients, vignetting profiles, or color channel responses corresponding to artifact-free illumination. In an embodiment, the training data may include images of clean or substantially clean slides captured under a variety of illumination conditions, imaging devices, and optical configurations. Such training data may further include synthetically generated or augmented slide images 130 in which illumination patterns are known or controlled, allowing the model to learn how illumination manifests in background regions 158 independent of tissue content. In another embodiment, the machine learning model 142 may be trained using unlabeled or weakly labeled data, in which background areas are automatically detected or inferred, and the model learns illumination characteristics 144 by minimizing reconstruction error, enforcing smoothness constraints, or separating low-frequency illumination components from higher-frequency sample or noise components. For example, an autoencoder or decomposition-based model may be trained to reconstruct background illumination while suppressing features associated with tissue edges, stains, or localized sample structures. In an embodiment, the training data may specifically comprise background-only image patches extracted from whole-slide images 130, sensor white reference images, and slide images 130 annotated to indicate regions 158 containing substantially no tissue or stain. The training data may further include corresponding illumination metadata, such as light source intensity, color temperature, optical path parameters, or spatial calibration maps, enabling the model to learn a mapping between observed background pixel values and underlying illumination behavior. In an embodiment, once trained, the machine learning model 142 may infer illumination-related features from the filtered slide image 126 by analyzing background areas and discounting residual sample content, artifacts, or noise. This enables isolation of lighting behavior that is independent of tissue or stain, which is then used to generate the slide white estimate 138. Finally, spatial intensity variation 146 across the slide image 126 may be estimated based on the extracted illumination characteristics 144. This estimation may model how illumination intensity changes across different spatial locations of the slide image 126, including gradients or non-uniformities. The combined results of noise filtering, machine learning-based illumination extraction, and spatial intensity variation 146 estimation are used to generate the slide white estimate 138, which approximates the idealized illumination profile 106 of a clean slide under the imaging conditions.

With continued reference to FIG. 1, the at least a processor 102 may be further configured to generate the synthetic slide white 134 as a function of the sensor white image 110 and the one or more illumination characteristics 144 extracted from the slide image 126. In an embodiment, the sensor white image 110 may provide a baseline representation of illumination transmitted through the optical path 114 in the absence 116 of a slide 118, while the illumination characteristics 144 extracted from the slide image 126 may capture how illumination behaves when interacting with the slide and sample. Without limitation, the processor 102 may integrate these sources of information to produce a synthetic slide white 134 that reflects expected illumination under ideal slide conditions. In another non-limiting example, the processor 102 may extract illumination characteristics 144 from the slide image 126 by analyzing background areas or regions 158 of minimal sample content. In an embodiment, characteristics such as overall intensity level, radial intensity variation 120, spatial illumination gradients, and the like may be derived from the slide image 126. Without limitation, these characteristics may be combined with the sensor white image 110 to adjust intensity scaling or spatial correction factors used to generate the synthetic slide white 134. In still another non-limiting example, the processor 102 may apply computational processing to merge the sensor white image 110 and the extracted illumination characteristics 144 into a unified synthetic slide white 134 image. In an embodiment, this processing may include normalization, scaling, or filtering operations that align the illumination profile 106 of the sensor white image 110 with slide specific illumination behavior. Without limitation, the resulting synthetic slide white 134 image may serve as a replacement for a physically captured slide white and may be used for flat field correction 154 of subsequently received slide images 130.

With continued reference to FIG. 1, the one or more illumination characteristics 144 may include at least an overall intensity parameter 148. As used in this disclosure, "overall intensity parameter" is a quantitative measure representing an aggregate illumination level of an image or a portion of an image. In an embodiment, the overall intensity parameter 148 may be computed as an average of pixel intensity values 156 across an entire image or across a selected region of the image. In a non-limiting example, the overall intensity parameter 148 may represent a baseline brightness level used to scale or normalize subsequently captured slide images 130. Without limitation, changes in the overall intensity parameter 148 may indicate variation in illumination source output or optical transmission efficiency. In a non-limiting example, the one or more illumination characteristics 144 may include a radial intensity profile extracted from a slide image 126 or a sensor white image 110. As used in this disclosure, "radial intensity profile" is a representation of how illumination intensity varies as a function of distance from a central region 122 of an image toward one or more peripheral regions 124 of the image. In an embodiment, the radial intensity profile may be determined by measuring intensity values along concentric regions 158 centered on a geometric center of the image. In a non-limiting example, the radial intensity profile may show higher intensity near the center and progressively lower intensity toward edges due to optical falloff. Without limitation, the radial intensity profile may be stored as part of an illumination profile 106 and used to correct spatial nonuniformity during image normalization. In an embodiment, the overall intensity parameter 148 may capture a global brightness level of the illumination independent of spatial variation. Without limitation, this parameter may be used to adjust gain or normalization factors applied during image correction. In another non-limiting example, the one or more illumination characteristics 144 may further include a radial intensity profile describing changes in illumination intensity from a central region 122 of the image toward peripheral regions 124. In an embodiment, the radial intensity profile may be derived by measuring intensity values along concentric regions 158 extending outward from the center. Without limitation, the radial intensity profile may capture center brightening and edge darkening effects caused by lens geometry or illumination coupling. In another non-limiting example, the processor 102 may extract both the overall intensity parameter 148 and the radial intensity profile and use them together to characterize illumination behavior more completely. In an embodiment, the overall intensity parameter 148 may define a global scaling factor, while the radial intensity profile may define spatial correction factors applied across the image. Without limitation, combining these illumination parameters may enable generation of a synthetic slide white 134 that accurately reflects both brightness level and spatial illumination variation from center to corners.

Still referring to FIG. 1, processor 102 is configured to modify the slide image 126 using the synthetic slide white 134 to compensate for illumination non-uniformity 150 within the slide image 126. As used in this disclosure, "illumination non-uniformity" is a condition in which illumination intensity varies across a slide image 126. In an embodiment, illumination non-uniformity 150 may manifest as brighter regions 158 and darker regions 158 within a single slide image 126. In a non-limiting example, illumination non-uniformity 150 may include center brightening and edge darkening caused by optical lens geometry. Without limitation, illumination non-uniformity 150 may also arise from illumination source drift, optical misalignment, or partial occlusion within an optical path 114. In a non-limiting example, the processor 102 may be configured to modify a slide image 126 by applying a synthetic slide white 134 to compensate for illumination non-uniformity 150 present within the slide image 126. In an embodiment, the processor 102 may normalize pixel intensity values 156 of the slide image 126 using corresponding values derived from the synthetic slide white 134 so that spatial brightness variations are reduced. Without limitation, this modification may result in a slide image 126 exhibiting more uniform brightness across central and peripheral regions 124. In another non-limiting example, compensating for illumination non-uniformity 150 may include dividing or scaling pixel intensity values 156 of the slide image 126 based on spatial correction factors derived from the synthetic slide white 134. In an embodiment, regions 158 of the slide image 126 that appear darker due to illumination falloff may be amplified, while regions 158 that appear brighter may be attenuated. Without limitation, this compensation may improve visual consistency and accuracy of downstream image analysis or stitching operations. In another non-limiting example, the processor 102 may apply the synthetic slide white 134 uniformly across a plurality of slide images 130 to ensure consistent illumination correction throughout a scanning session. In an embodiment, each slide image 126 may be modified using the same synthetic slide white 134 when illumination conditions remain stable. Without limitation, this approach may reduce visible seams between adjacent slide images 130 and improve overall image quality by mitigating illumination non-uniformity 150 across the entire slide.

Still referring to FIG. 1, processor 102 is configured to generate a synthetic image 152 as a function of modifying the slide image 126. As used in this disclosure, "synthetic image" is an image generated by computationally transforming an acquired slide image 126. In an embodiment, the synthetic image 152 may be compensated for illumination non-uniformity 150 and other system induced artifacts, such that the resulting image represents a normalized approximation of how the slide would appear under substantially uniform illumination. In an embodiment, the synthetic image 152 may be produced by applying a synthetic slide white 134 to the slide image 126 to correct spatial intensity variations across the field of view. In a non-limiting example, the synthetic image 152 may exhibit reduced center brightening and reduced edge darkening relative to the original slide image 126. Without limitation, the synthetic image 152 may be used for visualization, analysis, stitching operations, and the like that benefit from uniform illumination characteristics 144. In a non-limiting example, the processor 102 may generate the synthetic image 152 by modifying pixel intensity values 156 of the slide image 126 based on correction factors derived from the synthetic slide white 134. In an embodiment, darker regions 158 of the slide image 126 caused by illumination falloff may be amplified while brighter regions 158 may be attenuated to achieve normalization. Without limitation, this transformation may reduce illumination induced artifacts while preserving structural and color information associated with the sample. In another non-limiting example, the synthetic image 152 may be generated as part of a pipeline that processes a plurality of slide images 130 captured across a slide 118. In an embodiment, each slide image 126 may be modified using the same synthetic slide white 134 when illumination conditions remain stable. Without limitation, generating synthetic images in this manner may improve consistency across adjacent images and reduce visible seams or artifacts when the images are combined into a larger composite representation.

With continued reference to FIG. 1, the at least a processor 102 may be further configured to modify the slide image 126 by performing flat field correction 154. As used in this disclosure, "flat field correction" is an image processing technique that compensates for spatial illumination non-uniformity 150 and system induced intensity variation across a slide image 126. In an embodiment, flat field correction 154 may be performed by normalizing pixel intensity values 156 of a slide image 126 using a reference illumination representation such as a slide white or a synthetic slide white 134. In a non-limiting example, the processor 102 may apply a pixel wise correction in which each pixel of the slide image 126 is scaled based on a corresponding value from the reference illumination image to reduce brightness gradients. Without limitation, flat field correction 154 may produce a slide image 126 that appears uniformly illuminated across both central and peripheral regions 124. In a non-limiting example, performing flat field correction 154 may include dividing the slide image 126 by a synthetic slide white 134 that represents expected illumination under ideal conditions. In an embodiment, this division may be followed by rescaling to preserve overall image brightness and dynamic range. Without limitation, this approach may correct for center brightening, edge darkening, and other spatial illumination artifacts introduced by the optical system. In another non-limiting example, flat field correction 154 may be applied consistently across a plurality of slide images 130 captured during a scanning session. In an embodiment, the same synthetic slide white 134 may be used to correct each slide image 126 when illumination conditions remain stable. Without limitation, performing flat field correction 154 may reduce visible seams between adjacent slide images 130 and improve accuracy of downstream stitching, visualization, and image analysis operations.

With continued reference to FIG. 1, the at least a processor 102 may be further configured to perform the flat field correction 154 by adjusting pixel intensity values 156 of the slide image 126 based on the synthetic slide white 134 and normalizing illumination response across different regions 158 of the slide image 126. As used in this disclosure, “pixel intensity values” are numerical values associated with individual pixels of an image that represent measured light intensity at corresponding spatial locations. In an embodiment, pixel intensity values 156 may be represented as grayscale levels or multi-channel color values captured by an image sensor. In a non-limiting example, pixel intensity values 156 may vary across a slide image 126 due to illumination non-uniformity 150 rather than differences in the underlying sample. Without limitation, pixel intensity values 156 may be modified during image processing to achieve normalization or correction. As used in this disclosure, “illumination response” is a response in which pixel intensity values 156 of an image vary in response to illumination delivered through an optical path. In an embodiment, illumination response may reflect how different regions 158 of a slide image 126 receive different amounts of illumination due to optical geometry or illumination source characteristics. In a non-limiting example, illumination response may include higher pixel intensity values 156 in central regions 122 and lower pixel intensity values 156 in peripheral regions 124. Without limitation, illumination response may be normalized to improve image uniformity. As used in this disclosure, “regions” are defined portions of a slide image 126 that correspond to specific spatial areas within a field of view. In an embodiment, regions 158 may be defined as central regions 122, peripheral regions 124, discrete tiles of the slide image 126, and the like. In a non-limiting example, regions 158 may be identified based on spatial location, intensity characteristics, or sample content. Without limitation, regions 158 may be used to analyze and correct spatial variations in illumination. In a non-limiting example, the processor 102 may perform flat field correction 154 by adjusting pixel intensity values 156 of the slide image 126 using corresponding values derived from the synthetic slide white 134. In an embodiment, pixel intensity values 156 in darker regions 158 may be increased while pixel intensity values 156 in brighter regions 158 may be decreased to compensate for illumination non-uniformity 150. Without limitation, this adjustment may normalize illumination response across different regions 158 of the slide image 126. In another non-limiting example, normalizing illumination response across regions 158 may include applying region specific correction factors computed from the synthetic slide white 134. In an embodiment, each region of the slide image 126 may be assigned a normalization factor based on local illumination characteristics 144. Without limitation, applying these factors may reduce spatial brightness gradients and improve consistency across the slide image 126. In an embodiment, the processor 102 may determine from the synthetic slide white 134 that the central region 122 has an average pixel intensity value of 220, while a peripheral region has an average pixel intensity value of 180. Without limitation, the processor 102 may compute a normalization factor of 220 divided by 180 for the peripheral region and apply this factor to increase pixel intensity values 156 in that peripheral region. In another non-limiting example, the processor 102 may determine different normalization factors for multiple peripheral regions 124 based on localized illumination characteristics 144 captured in the synthetic slide white 134. In an embodiment, a top left region may require a normalization factor of 1.15, a bottom right region may require a normalization factor of 1.10, and the central region 122 may require a normalization factor of 1.00. Without limitation, applying these region specific factors may reduce brightness differences across the slide image 126. In another non-limiting example, the processor 102 may apply region specific correction factors to each slide image 126 captured during a scanning session. In an embodiment, each region of each slide image 126 may be scaled according to its assigned normalization factor prior to stitching. Without limitation, this process may improve consistency between adjacent regions 158 and reduce visible seams caused by spatial brightness gradients across the slide image 126. In another non-limiting example, flat field correction 154 may be applied uniformly across a plurality of slide images 130 using the same synthetic slide white 134 when illumination conditions remain stable. In an embodiment, normalization of illumination response across regions 158 may improve stitching quality and reduce visible seams between adjacent slide images 130. Without limitation, this processing may enhance both visual appearance and quantitative accuracy of the resulting images.

With continued reference to FIG. 1, the at least a processor 102 may be further configured to stitch a plurality of modified slide images 160 into a composite image 162, transmit the composite image 162 to a downstream device 164, and display, using a display 166 of the downstream device 164, a visual 168 wherein the visual 168 comprises the composite image 162 and a side-by-side presentation 170 of the slide image 126 and the synthetic image 152. As used in this disclosure, “composite image” is an image formed by combining a plurality of slide images 130 into a single unified image representing a larger continuous area. In an embodiment, the composite image 162 may represent an entire slide assembled from many smaller slide images 130 captured at different spatial locations. In a non-limiting example, adjacent slide images 130 may be aligned and merged so that boundaries between the slide images 130 are visually minimized. Without limitation, the composite image 162 may be generated after illumination correction to improve continuity and uniformity. As used in this disclosure, “downstream device” is a device that accesses and interacts with apparatus 100. For instance, and without limitation, downstream device 164 may include a remote device and/or apparatus 100. In a non-limiting embodiment, downstream device 164 may be consistent with a computing device as described in the entirety of this disclosure. Without limitation, the downstream device 164 may include a display device. As used in this disclosure, a "display device" refers to an electronic device that visually presents information to the entity. In some cases, display device may be configured to project or show visual content generated by computers, video devices, or other electronic mechanisms. In some cases, display device may include a liquid crystal display (LCD), a cathode ray tube (CRT), a plasma display, a light emitting diode (LED) display, and any combinations thereof. In a non-limiting example, one or more display devices may vary in size, resolution, technology, and functionality. Display device may be able to show any data elements and/or visual elements as listed above in various formats such as, textural, graphical, video among others, in either monochrome or color. Display device may include, but is not limited to, a smartphone, tablet, laptop, monitor, tablet, and the like. Display device may include a separate device that includes a transparent screen configured to display computer generated images and/or information. In some cases, display device may be configured to present a graphical user-interface (GUI) to a user, wherein a user may interact with a GUI. In some cases, a user may view a GUI through display. Additionally, or alternatively, processor 102 be connected to display device. In one or more embodiments, transmitting the composite image 162 may include displaying the composite image 162 at display device using a visual interface. As used in this disclosure, a "user interface" is a collection of hardware and/or software components configured to enable interaction between a user and a computing device, wherein the user interface facilitates the presentation of data to the user and the reception of input from the user. The user interface may include, without limitation, graphical user interfaces, command-line interfaces, application programming interfaces, voice-based interfaces, haptic interfaces, or augmented reality interfaces. A "graphical user interface," as used herein, is a graphical form of user interface that allows users to interact with electronic devices. In some embodiments, GUI may include icons, menus, other visual indicators or representations (graphics), audio indicators such as primary notation, and display information and related user controls. A menu may contain a list of choices and may allow users to select one from them. A menu bar may be displayed horizontally across the screen such as pull-down menu. When any option is clicked in this menu, then the pull-down menu may appear. A menu may include a context menu that appears only when the user performs a specific action. An example of this is pressing the right mouse button. When this is done, a menu may appear under the cursor. Files, programs, web pages and the like may be represented using a small picture in a graphical user interface. For example, links to decentralized platforms as described in this disclosure may be incorporated using icons. Using an icon may be a fast way to open documents, run programs etc. because clicking on them yields instant access.

With continued reference to FIG. 1, in an embodiment, the graphical user interface and an event handler may operate together to enable seamless interaction between the user and the apparatus 100. The GUI serves as the visual and interactive layer through which the user engages with the apparatus 100, presenting elements such as buttons, sliders, input fields, and informational displays. The event handler, on the other hand, functions as the underlying mechanism that monitors and responds to user interactions with the GUI. For example, when a user clicks a button on the GUI to request an explanation of a concept, the event handler may detect the click event, identify its context, and trigger the appropriate processes within the apparatus 100 to generate a tailored response. This interplay may ensure dynamic and responsive system behavior, as the event handler processes various input events such as clicks, taps, keystrokes, or voice commands, and relays these inputs to the relevant system components. The GUI subsequently updates to reflect the system's responses, such as displaying output, modifying visual elements, or providing real-time feedback. Together, the GUI and event handler create an intuitive and interactive experience, bridging user actions and system functionality to achieve efficient and personalized outcomes.

With continued reference to FIG. 1, an "event handler," as used in this disclosure, is a module, data structure, function, and/or routine that performs an action in response to an event. For instance, and without limitation, an event handler may record data corresponding to user selections of previously populated fields such as drop-down lists and/or text auto-complete and/or default entries, data corresponding to user selections of checkboxes, radio buttons, or the like, potentially along with automatically entered data triggered by such selections, user entry of textual data using a keyboard, touchscreen, speech-to-text program, or the like. Event handler may generate prompts for further information, may compare data to validation rules such as requirements that the data in question be entered within certain numerical ranges, and/or may modify data and/or generate warnings to a user in response to such requirements.

With continued reference to FIG. 1, as used in this disclosure, a "visual element" is a component or feature within a system, display, or interface that conveys information through visual means. In a non-limiting example, the visual element may include text, images, icons, shapes, colors, and/or other graphical components designed to be perceived by the user. In a non-limiting example, the visual element may aid in communication, navigation, and/or interaction with the system. Without limitation, the visual element may be used to enhance user experience, guide behavior, and/or represent data visually in an intuitive or informative way. A visual element may include data transmitted to display device, client device, and/or graphical user interface. In some embodiments, visual element may be interacted with. For example, visual element may include an interface, such as a button or menu. In some embodiments, visual element may be interacted with using a user device such as a smartphone, tablet, smartwatch, or computer.

With continued reference to FIG. 1, in an embodiment, the apparatus 100 and or the downstream device 164 may include a data structure. As used in this disclosure, "data structure" is a way of organizing data represented in a specialized format on a computer configured such that the information can be effectively presented in a graphical user interface. In some cases, the data structure includes any input data. In some cases, the data structure contains data and/or rules used to visualize the graphical elements within a graphical user interface. In some cases, the data structure may include any data described in this disclosure. In some cases, the data structure may be configured to modify the graphical user interface, wherein data within the data structure may be represented visually by the graphical user interface. In some cases, the data structure may be continuously modified and/or updated by processor 102, wherein elements within graphical user interface may be modified as a result. In some cases, processor 102 may be configured to transmit display device and or the downstream device 164 the data structure. Transmitting may include, and without limitation, transmitting using a wired or wireless connection, direct, or indirect, and between two or more components, circuits, devices, systems, and the like, which allows for reception and/or transmittance of data and/or signal(s) therebetween. Data and/or signals there between may include, without limitation, electrical, electromagnetic, magnetic, video, audio, radio, and microwave data and/or signals, combinations thereof, and the like, among others. Processor 102 may transmit the data described above to a database wherein the data may be accessed from the database. Processor 102 may further transmit the data above to a display device, client device, or another computing device. The data structure may serve as the organizational framework that stores, retrieves, and manages data required for processing events and updating the GUI. The data structure may act as a bridge between the user's input, captured by the event handler, and the output displayed on the GUI, ensuring that information is handled efficiently and accurately throughout the interaction. For example, without limitation, when a user interacts with a dropdown menu in the GUI to select a topic, the event handler may capture this input and accesses a data structure. The data structure may retrieve the relevant information such as, text explanations, videos, or interactive exercises, and passes it back to the event handler, which may then trigger the appropriate updates to the GUI. In another embodiment, the data structure may also maintain the state of the system, tracking user progress, preferences, and session history. For instance, without limitation, a hash table may store user specific configurations which the event handler references when processing interactions. The GUI may then dynamically adapt to display content aligned with these configurations. This integration may ensure that user inputs are seamlessly translated into meaningful system outputs, with the data structure enabling rapid access, consistency, and scalability throughout the process. As used in this disclosure, a "hash table" is a data structure that stores data in a way that allows for fast retrieval, insertion, and deletion of elements. The hash table may organize data into key-value pairs, where each key is unique and used to identify its corresponding value. A hash table may use a hash function to compute an index, or hash code, from the key, which determines where the key-value pair is stored within an array or list.

With continued reference to FIG. 1, as used in this disclosure, an "interactive element" is a component or feature within a graphical user interface (GUI) that allows users to perform actions, provide input, or engage with the apparatus 100. Interactive elements may be designed to facilitate two-way communication between the user and the system, enabling the user to influence the behavior of the apparatus or obtain feedback in response to their actions. Examples of interactive elements may include buttons, dropdown menus, sliders, checkboxes, input fields, and hyperlinks. More advanced interactive elements may include drag-and-drop interfaces, interactive diagrams, or dynamically updating content areas that respond to user actions in real time. The interactive elements may enhance user engagement by providing intuitive and responsive mechanisms for interacting with the system. Interactive elements may operate by responding to user actions such as clicks, taps, swipes, or keyboard inputs, and triggering predefined system behaviors or processes. The execution of the interactive elements may require a combination of front-end and back-end technologies that work together to provide seamless functionality and user interaction. On the front end, technologies such as HTML and CSS may define the structure, appearance, and layout of the interactive elements, while JavaScript may enable dynamic functionality. For example, without limitation, JavaScript may detect when the user clicks a button and trigger actions or animations. Front-end frameworks like React, Angular, or Vue.js may further enhance development by offering reusable components and efficient rendering mechanisms. On the back end, the system may process the user's input, retrieve the necessary data, and communicate with the front end to provide an appropriate response. APIs may act as a bridge between the front end and back end, facilitating data transfer, such as sending a user's form submission to the server and retrieving processed results. Server-side logic, implemented using languages like Python, Java, or Node.js, may handle input processing and return relevant data. Additional supporting technologies may ensure the smooth operation of interactive elements. Event listeners, for instance, may continuously monitor for specific actions like mouse clicks or text entries, executing code when such events are detected. Efficient data structures, such as hash tables or dictionaries, may store interactive state data, such as user preferences or settings, for quick access and updates. Databases, including MySQL or MongoDB, may manage and store the data required for interactive features, such as user profiles or historical activity. Communication technologies may also help maintain the responsiveness of interactive elements. AJAX (Asynchronous Javascript and XML) may allow the front end to update portions of a web page without requiring a full page reload, enhancing responsiveness. WebSockets may provide real-time interaction capabilities, such as live chats or collaborative tools, by enabling persistent communication between the client and the server. Without limitation, the apparatus 100 may include one or more APIs. As used in this disclosure, an "application programming interface (API)" is a set of defined protocols, tools, and methods that allow different software applications, systems, or components to communicate and interact with each other. An API may act as an intermediary that enables a client application, such as a user-facing app, to send requests to a server or service and receive the necessary responses, facilitating seamless integration and functionality across diverse systems.

With continued reference to FIG. 1, as used in this disclosure, "visual" is an image or set of images rendered for display to a user. In an embodiment, the visual 168 may be presented on a display 166 of a downstream device 164 such as a workstation, monitor, tablet, and the like. In a non-limiting example, the visual 168 may include one or more images intended for inspection, comparison, analysis, and the like. Without limitation, the visual 168 may be generated by a processor 102 and transmitted for display. In a non-limiting example, the visual 168 may include one or more images displayed on a downstream device 164 to enable inspection, comparison, or analysis by a user. In an embodiment, the visual 168 may present a composite image 162 representing a stitched slide alongside one or more individual slide images 130 or synthetic images. Without limitation, the visual 168 may allow a user to inspect image quality, illumination uniformity, or structural detail across different representations of the same slide region. In another non-limiting example, the visual 168 may include overlapping images or partially overlapping image regions 158 arranged to facilitate direct comparison. In an embodiment, a synthetic image 152 may be overlaid on a corresponding slide image 126 such that common features align spatially. Without limitation, transparency, blending, or toggling controls may be applied to overlapping regions 158 so that differences between the images become visually apparent. In another non-limiting example, overlapping or partially overlapping image regions 158 may be used to assess alignment accuracy during stitching or registration. In an embodiment, overlapping regions 158 from adjacent slide images 130 may be displayed together to allow evaluation of continuity, seam visibility, or misalignment. Without limitation, this detailed visual presentation may support validation of stitching quality, correction effectiveness, and overall imaging system performance. As used in this disclosure, "side-by-side presentation" is a display arrangement in which two images are shown adjacent to one another. The side-by-side presentation 170 may be used for comparison. In an embodiment, the side-by-side presentation 170 may align images horizontally or vertically on a display 166. In a non-limiting example, a slide image 126 may be displayed next to a corresponding synthetic image 152 to illustrate illumination correction effects. Without limitation, the side-by-side presentation 170 may facilitate visual evaluation of differences between images. In a non-limiting example, the processor 102 may stitch a plurality of modified slide images 160 into a composite image 162 after flat field correction 154 has been applied to each slide image 126. In an embodiment, stitching may include spatial alignment and blending of overlapping regions 158 to form a continuous composite image 162 representing the slide. Without limitation, the composite image 162 may be transmitted to a downstream device 164 for display or storage. In another non-limiting example, the processor 102 may generate a visual 168 that includes both the composite image 162 and a side-by-side presentation 170 of an original slide image 126 and a corresponding synthetic image 152. In an embodiment, the slide image 126 may be displayed alongside the synthetic image 152 to demonstrate reduction of illumination non-uniformity 150. Without limitation, displaying these images together may assist a user in assessing image quality and correction effectiveness. In another non-limiting example, the downstream device 164 may display the visual 168 on a display 166 screen, allowing a user to view the stitched composite image 162 while simultaneously comparing the slide image 126 and synthetic image 152. In an embodiment, the composite image 162 may occupy a primary portion of the display 166, while the side-by-side presentation 170 may appear in an adjacent region. Without limitation, this display arrangement may support efficient review, validation, and analysis of slide imaging results.

With continued reference to FIG. 1, the at least a processor 102 may be further configured to receive the plurality of slide images 130 from the image capturing system 108 during image acquisition and generate the synthetic image 152 inline with acquisition of the plurality of slide images 130. As used in this disclosure, "inline" is used to describe an operational mode in which a processing action is performed contemporaneously with, and as part of, an ongoing primary operation, without requiring a separate post-processing step or a completed dataset before initiation of the processing action. In a non-limiting example, generating a synthetic image 152 inline with acquisition of a plurality of slide images 130 means that the processor 102 performs synthetic image generation during image acquisition, such that the synthetic image 152 is produced progressively or in real time as slide images are received from the image capturing system, rather than after acquisition of all slide images has concluded. In a non-limiting example, the processor 102 may be configured to receive a plurality of slide images 130 from the image capturing system 108 as the slide images 130 are being acquired during an active scanning operation. In an embodiment, the image capturing system 108 may capture slide images 130 sequentially across different spatial locations of a slide 118, and each slide image 126 may be transmitted to the processor 102 immediately upon capture. Without limitation, this continuous reception may allow the processor 102 to access slide image 126 data in real time rather than after completion of the entire scan. In another non-limiting example, the processor 102 may generate the synthetic image 152 inline with acquisition of the plurality of slide images 130, such that illumination correction and image modification occur contemporaneously with image capture. In an embodiment, as each slide image 126 is received, the processor 102 may apply flat field correction 154 using a synthetic slide white 134 and generate a corresponding synthetic image 152 before the next slide image 126 is acquired. Without limitation, inline generation may reduce latency and eliminate the need for post acquisition batch processing. In another non-limiting example, inline generation of the synthetic image 152 may enable immediate quality assessment and downstream processing. In an embodiment, the synthetic image 152 may be forwarded to stitching, display, or analysis modules as soon as it is generated. Without limitation, performing synthetic image 152 generation inline with acquisition may improve throughput, support real time visualization, and allow rapid detection of illumination or imaging issues during the scanning process.

Figure 2:
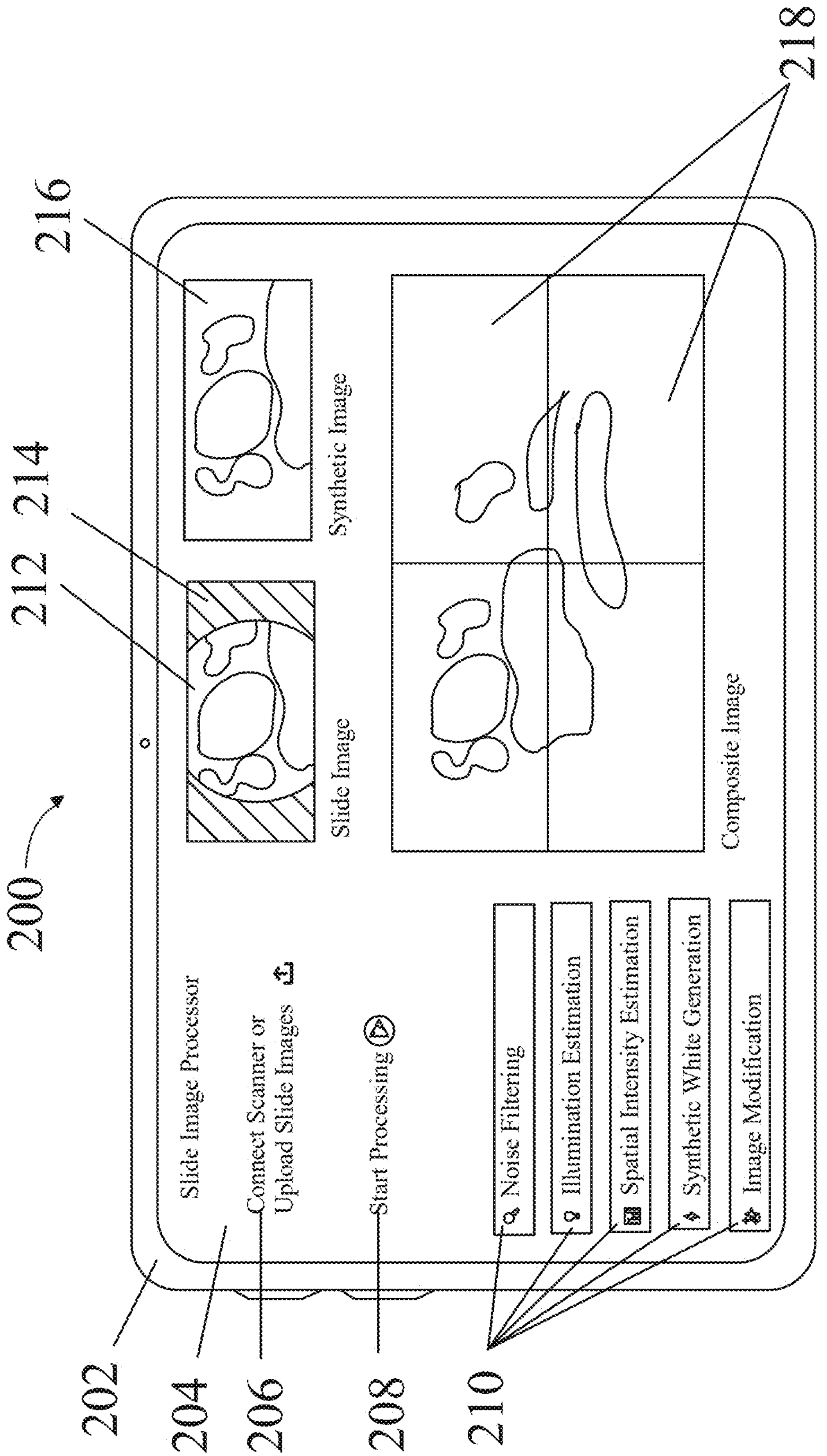
FIG. 2 is an exemplary illustration of a display of a downstream device displaying a visual comprising a composite image and a side-by-side presentation of a slide image and a synthetic image.

Referring now to FIG. 2, an exemplary illustration 200 of a display of a downstream device displaying a visual comprising a composite image and a side-by-side presentation of a slide image and a synthetic image is shown. In an embodiment, the illustration 200 may include a downstream device 202. Without limitation, the downstream device 202 is a computing device configured to receive, process, and display image data, and may include a workstation, desktop computer, laptop computer, tablet, or other electronic device capable of executing image processing software. In a non-limiting example, the downstream device 202 may be used by a technician or pathologist to review slide images and corresponding synthetic images. Without limitation, the downstream device 202 may include one or more processors, memory, storage, and communication interfaces. In an embodiment, the illustration 200 may include a display 204. Without limitation, the display 204 is a visual output component configured to render images, graphics, and user interface elements. In a non-limiting example, the display 204 may be a liquid crystal display, light emitting diode display, or other flat panel display integrated with or coupled to the downstream device 202. Without limitation, the display 204 may present multiple images simultaneously, including side-by-side or overlapping image regions. In an embodiment, the illustration 200 may include an image receiving button 206. Without limitation, the image receiving button 206 is a user interface control configured to initiate receipt of one or more slide images. In a non-limiting example, activation of the image receiving button 206 may connect to an image capturing system, upload slide images from a local or remote database, or retrieve previously acquired slide images from storage. Without limitation, the image receiving button 206 may support receipt of single slide images or a plurality of slide images associated with a scanning session. In an embodiment, the illustration 200 may include a start processing button 208. Without limitation, the start processing button 208 is a user interface control configured to initiate image processing operations. In a non-limiting example, activation of the start processing button 208 may trigger illumination estimation, synthetic white generation, flat-field correction, or synthetic image 152 generation. Without limitation, the start processing button 208 may initiate processing inline with acquisition or as a post-acquisition operation. In an embodiment, the illustration 200 may include one or more steps of image processing 210. Without limitation, the one or more steps of image processing 210 are representations of processing operations applied to slide images, and may include noise filtering, illumination estimation, spatial intensity estimation, synthetic white generation, and image modification. In a non-limiting example, the steps of image processing 210 may be executed sequentially or selectively based on detected illumination conditions. Without limitation, the steps of image processing 210 may be implemented in software, firmware, hardware, or a combination thereof. In an embodiment, the illustration 200 may include a digital representation of a slide image 212. Without limitation, the digital representation of the slide image 212 is an image acquired from an image capturing system that depicts at least a portion of a physical slide. In a non-limiting example, the slide image 212 may include sample structures and illumination artifacts introduced by optical non-uniformity. Without limitation, the slide image 212 may be one of a plurality of slide images used to generate a composite image. In an embodiment, the illustration 200 may include an illumination non-uniformity 214. Without limitation, the illumination non-uniformity 214 is a spatial variation in brightness within the slide image 212 caused by optical geometry, illumination drift, contamination, or misalignment. In a non-limiting example, the illumination non-uniformity 214 may appear as center brightening, edge darkening, or localized attenuation regions. Without limitation, the illumination non-uniformity 214 may be visually apparent prior to flat-field correction. In an embodiment, the illustration 200 may include a synthetic image 216. Without limitation, the synthetic image 216 is a processed version of the slide image generated by compensating for illumination non-uniformity and system-induced artifacts. In a non-limiting example, the synthetic image 216 may be produced using a synthetic slide white derived from scanner white and extracted illumination characteristics. Without limitation, the synthetic image 216 may represent a normalized approximation of how the slide would appear under substantially uniform illumination. In an embodiment, the illustration 200 may include a composite image 218. Without limitation, the composite image 218 is an image formed by stitching together a plurality of modified slide images. In a non-limiting example, the composite image 218 may represent a larger contiguous region of the slide assembled from multiple tiles. Without limitation, the composite image 218 may include overlapping regions that are blended to reduce visible seams and improve visual continuity.

Figure 3:
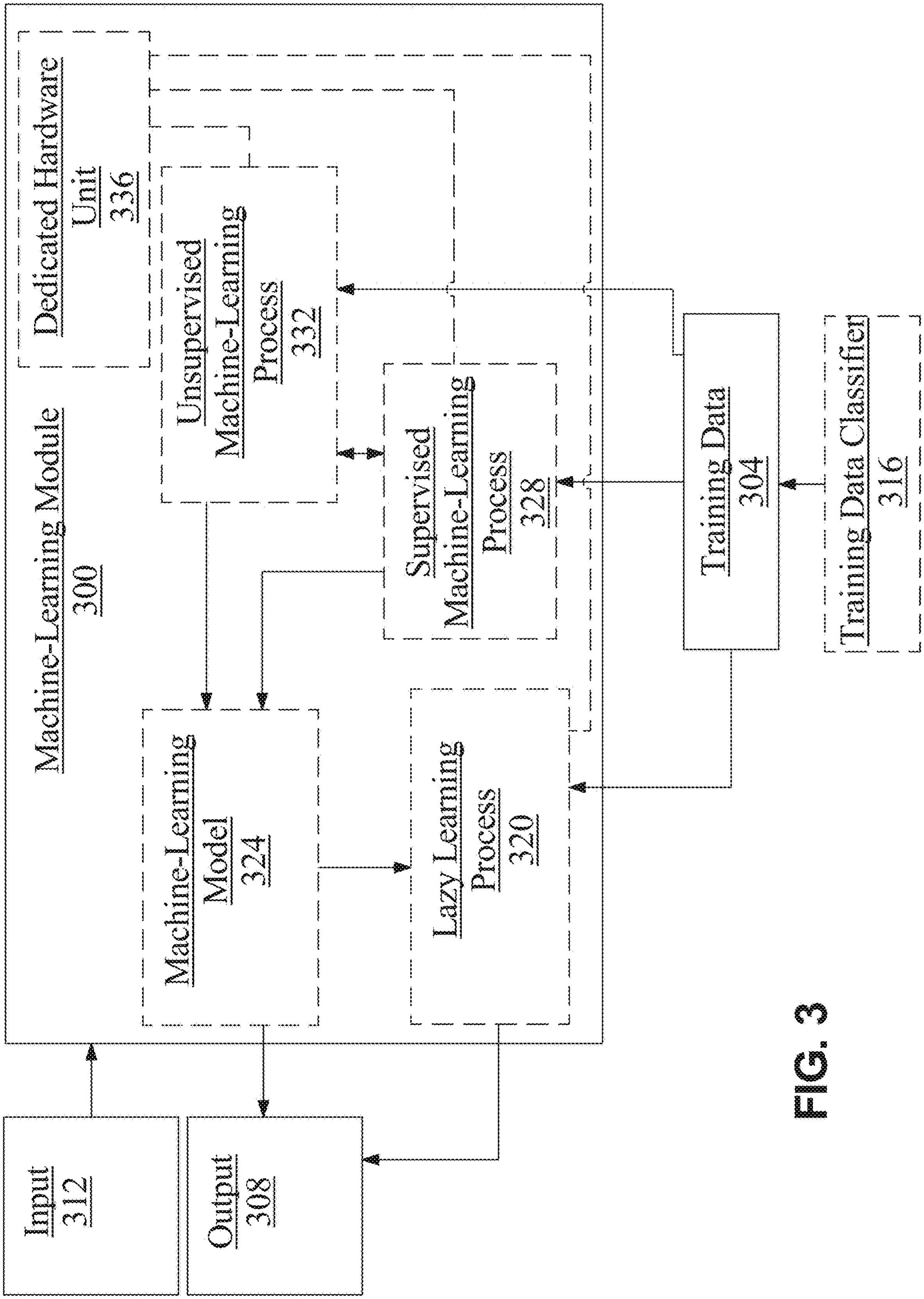
FIG. 3 is a block diagram of an exemplary machine-learning module.

Referring now to FIG. 3, an exemplary embodiment of a machine-learning module 300 that may perform one or more machine-learning processes as described in this disclosure is illustrated. Machine-learning module may perform determinations, classification, and/or analysis steps, methods, processes, or the like as described in this disclosure using machine learning processes. A "machine learning process," as used in this disclosure, is a process that automatedly uses training data 304 to generate an algorithm instantiated in hardware or software logic, data structures, and/or functions that will be performed by a computing device/module to produce outputs 308 given data provided as inputs 312; this is in contrast to a non-machine learning software program where the commands to be executed are determined in advance by a user and written in a programming language.

Still referring to FIG. 3, "training data," as used herein, is data containing correlations that a machine-learning process may use to model relationships between two or more categories of data elements. For instance, and without limitation, training data 304 may include a plurality of data entries, also known as "training examples," each entry representing a set of data elements that were recorded, received, and/or generated together; data elements may be correlated by shared existence in a given data entry, by proximity in a given data entry, or the like. Multiple data entries in training data 304 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 304 according to various correlations; correlations may indicate causative and/or predictive links between categories of data elements, which may be modeled as relationships such as mathematical relationships by machine-learning processes as described in further detail below. Training data 304 may be formatted and/or organized by categories of data elements, for instance by associating data elements with one or more descriptors corresponding to categories of data elements. As a non-limiting example, training data 304 may include data entered in standardized forms by persons or processes, such that entry of a given data element in a given field in a form may be mapped to one or more descriptors of categories. Elements in training data 304 may be linked to descriptors of categories by tags, tokens, or other data elements; for instance, and without limitation, training data 304 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively or additionally, and continuing to refer to FIG. 3, training data 304 may include one or more elements that are not categorized; that is, training data 304 may not be formatted or contain descriptors for some elements of data. Machine-learning algorithms and/or other processes may sort training data 304 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 304 to be made applicable for two or more distinct machine-learning algorithms as described in further detail below. Training data 304 used by machine-learning module 300 may correlate any input data as described in this disclosure to any output data as described in this disclosure. As a non-limiting illustrative example, input data may include one or more sensor white images, one or more slide images, illumination profiles, overall intensity parameters, radial intensity profiles, background area measurements, or temporal sequences of scanner white images captured over time, while corresponding output data may include synthetic slide white images, synthetic images generated from slide images, illumination correction maps, flat-field correction parameters, deviation indicators, or normalization factors applied to pixel intensity values. In a non-limiting example, training data may associate a sensor white image exhibiting center brightening and edge darkening with a synthetic slide white that compensates for the detected radial intensity variation. Without limitation, training data may further associate contaminated slide images containing debris-induced illumination attenuation with output images in which illumination non-uniformity has been reduced or removed, enabling the machine-learning module to learn mappings between raw illumination conditions and corrected image representations.

Further referring to FIG. 3, training data may be filtered, sorted, and/or selected using one or more supervised and/or unsupervised machine-learning processes and/or models as described in further detail below; such models may include without limitation a training data classifier 316. Training data classifier 316 may include a "classifier," which as used in this disclosure is a machine-learning model as defined below, such as a data structure representing and/or using a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. A distance metric may include any norm, such as, without limitation, a Pythagorean norm. Machine-learning module 300 may generate a classifier using a classification algorithm, defined as a processes whereby a computing device and/or any module and/or component operating thereon derives a classifier from training data 304. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers. As a non-limiting example, training data classifier 316 may classify elements of training data to characterize sub-populations of illumination conditions, optical system states, or image artifact types, such as cohorts of slide images exhibiting similar illumination non-uniformity patterns, scanner white images corresponding to specific hardware configurations, or temporal groups of images associated with a common illumination drift behavior. In an embodiment, the classifier 316 may assign training data to classes representing center-bright illumination profiles, edge-dark illumination profiles, localized attenuation artifacts, or debris-induced occlusion artifacts. Without limitation, such classification may enable selection of a subset of training data corresponding to a particular optical condition, slide condition, or acquisition context for training, validation, or inference by the machine-learning module.

Still referring to FIG. 3, computing device may be configured to generate a classifier using a Naïve Bayes classification algorithm. Naïve Bayes classification algorithm generates classifiers by assigning class labels to problem instances, represented as vectors of element values. Class labels are drawn from a finite set. Naïve Bayes classification algorithm may include generating a family of algorithms that assume that the value of a particular element is independent of the value of any other element, given a class variable. Naïve Bayes classification algorithm may be based on Bayes Theorem expressed as $P(A/B)=P(B/A)\ P(A)\div P(B)$, where $P(A/B)$ is the probability of hypothesis A given data B also known as posterior probability; $P(B/A)$ is the probability of data B given that the hypothesis A was true; $P(A)$ is the probability of hypothesis A being true regardless of data also known as prior probability of A; and $P(B)$ is the probability of the data regardless of the hypothesis. A naïve Bayes algorithm may be generated by first transforming training data into a frequency table. Computing device may then calculate a likelihood table by calculating probabilities of different data entries and classification labels. Computing device may utilize a naïve Bayes equation to calculate a posterior probability for each class. A class containing the highest posterior probability is the outcome of prediction. Naïve Bayes classification algorithm may include a gaussian model that follows a normal distribution. Naïve Bayes classification algorithm may include a multinomial model that is used for discrete counts. Naïve Bayes classification algorithm may include a Bernoulli model that may be utilized when vectors are binary.

With continued reference to FIG. 3, computing device may be configured to generate a classifier using a K-nearest neighbors (KNN) algorithm. A "K-nearest neighbors algorithm" as used in this disclosure, includes a classification method that utilizes feature similarity to analyze how closely out-of-sample-features resemble training data to classify input data to one or more clusters and/or categories of features as represented in training data; this may be performed by representing both training data and input data in vector forms, and using one or more measures of vector similarity to identify classifications within training data, and to determine a classification of input data. K-nearest neighbors algorithm may include specifying a K-value, or a number directing the classifier to select the k most similar entries training data to a given sample, determining the most common classifier of the entries in the database, and classifying the known sample; this may be performed recursively and/or iteratively to generate a classifier that may be used to classify input data as further samples. For instance, an initial set of samples may be performed to cover an initial heuristic and/or "first guess" at an output and/or relationship, which may be seeded, without limitation, using expert input received according to any process as described herein. As a non-limiting example, an initial heuristic may include a ranking of associations between inputs and elements of training data. Heuristic may include selecting some number of highest-ranking associations and/or training data elements.

With continued reference to FIG. 3, generating k-nearest neighbors algorithm may generate a first vector output containing a data entry cluster, generating a second vector output containing an input data, and calculate the distance between the first vector output and the second vector output using any suitable norm such as cosine similarity, Euclidean distance measurement, or the like. Each vector output may be represented, without limitation, as an n-tuple of values, where n is at least two values. Each value of n-tuple of values may represent a measurement or other quantitative value associated with a given category of data, or attribute, examples of which are provided in further detail below; a vector may be represented, without limitation, in n-dimensional space using an axis per category of value represented in n-tuple of values, such that a vector has a geometric direction characterizing the relative quantities of attributes in the n-tuple as compared to each other. Two vectors may be considered equivalent where their directions, and/or the relative quantities of values within each vector as compared to each other, are the same; thus, as a non-limiting example, a vector represented as [5, 10, 15] may be treated as equivalent, for purposes of this disclosure, as a vector represented as [1, 2, 3]. Vectors may be more similar where their directions are more similar, and more different where their directions are more divergent; however, vector similarity may alternatively or additionally be determined using averages of similarities between like attributes, or any other measure of similarity suitable for any n-tuple of values, or aggregation of numerical similarity measures for the purposes of loss functions as described in further detail below. Any vectors as described herein may be scaled, such that each vector represents each attribute along an equivalent scale of values. Each vector may be "normalized," or divided by a "length" attribute, such as a length attribute l as derived using a Pythagorean norm:

$$l = \sqrt{\sum_{i=0}^{n} a_i^2},$$

where $a_i$ is attribute number i of the vector. Scaling and/or normalization may function to make vector comparison independent of absolute quantities of attributes, while preserving any dependency on similarity of attributes; this may, for instance, be advantageous where cases represented in training data are represented by different quantities of samples, which may result in proportionally equivalent vectors with divergent values.

With further reference to FIG. 3, training examples for use as training data may be selected from a population of potential examples according to cohorts relevant to an analytical problem to be solved, a classification task, or the like. Alternatively or additionally, training data may be selected to span a set of likely circumstances or inputs for a machine-learning model and/or process to encounter when deployed. For instance, and without limitation, for each category of input data to a machine-learning process or model that may exist in a range of values in a population of phenomena such as images, user data, process data, physical data, or the like, a computing device, processor, and/or machine-learning model may select training examples representing each possible value on such a range and/or a representative sample of values on such a range. Selection of a representative sample may include selection of training examples in proportions matching a statistically determined and/or predicted distribution of such values according to relative frequency, such that, for instance, values encountered more frequently in a population of data so analyzed are represented by more training examples than values that are encountered less frequently. Alternatively or additionally, a set of training examples may be compared to a collection of representative values in a database and/or presented to a user, so that a process can detect, automatically or via user input, one or more values that are not included in the set of training examples. Computing device, processor, and/or module may automatically generate a missing training example; this may be done by receiving and/or retrieving a missing input and/or output value and correlating the missing input and/or output value with a corresponding output and/or input value collocated in a data record with the retrieved value, provided by a user and/or other device, or the like.

Continuing to refer to FIG. 3, computer, processor, and/or module may be configured to preprocess training data. "Preprocessing" training data, as used in this disclosure, is transforming training data from raw form to a format that can be used for training a machine learning model. Preprocessing may include sanitizing, feature selection, feature scaling, data augmentation and the like.

Still referring to FIG. 3, computer, processor, and/or module may be configured to sanitize training data. "Sanitizing" training data, as used in this disclosure, is a process whereby training examples are removed that interfere with convergence of a machine-learning model and/or process to a useful result. For instance, and without limitation, a training example may include an input and/or output value that is an outlier from typically encountered values, such that a machine-learning algorithm using the training example will be adapted to an unlikely amount as an input and/or output; a value that is more than a threshold number of standard deviations away from an average, mean, or expected value, for instance, may be eliminated. Alternatively or additionally, one or more training examples may be identified as having poor quality data, where "poor quality" is defined as having a signal to noise ratio below a threshold value. Sanitizing may include steps such as removing duplicative or otherwise redundant data, interpolating missing data, correcting data errors, standardizing data, identifying outliers, and the like. In a nonlimiting example, sanitization may include utilizing algorithms for identifying duplicate entries or spell-check algorithms.

As a non-limiting example, and with further reference to FIG. 3, images used to train an image classifier or other machine-learning model and/or process that takes images as inputs or generates images as outputs may be rejected if image quality is below a threshold value. For instance, and without limitation, computing device, processor, and/or module may perform blur detection, and eliminate one or more Blur detection may be performed, as a non-limiting example, by taking Fourier transform, or an approximation such as a Fast Fourier Transform (FFT) of the image and analyzing a distribution of low and high frequencies in the resulting frequency-domain depiction of the image; numbers of high-frequency values below a threshold level may indicate blurriness. As a further non-limiting example, detection of blurriness may be performed by convolving an image, a channel of an image, or the like with a Laplacian kernel; this may generate a numerical score reflecting a number of rapid changes in intensity shown in the image, such that a high score indicates clarity and a low score indicates blurriness. Blurriness detection may be performed using a gradient-based operator, which measures operators based on the gradient or first derivative of an image, based on the hypothesis that rapid changes indicate sharp edges in the image, and thus are indicative of a lower degree of blurriness. Blur detection may be performed using Wavelet-based operator, which takes advantage of the capability of coefficients of the discrete wavelet transform to describe the frequency and spatial content of images. Blur detection may be performed using statistics-based operators take advantage of several image statistics as texture descriptors in order to compute a focus level. Blur detection may be performed by using discrete cosine transform (DCT) coefficients in order to compute a focus level of an image from its frequency content.

Continuing to refer to FIG. 3, computing device, processor, and/or module may be configured to precondition one or more training examples. For instance, and without limitation, where a machine learning model and/or process has one or more inputs and/or outputs requiring, transmitting, or receiving a certain number of bits, samples, or other units of data, one or more training examples' elements to be used as or compared to inputs and/or outputs may be modified to have such a number of units of data. For instance, a computing device, processor, and/or module may convert a smaller number of units, such as in a low pixel count image, into a desired number of units, for instance by upsampling and interpolating. As a non-limiting example, a low pixel count image may have 100 pixels, however a desired number of pixels may be 128. Processor may interpolate the low pixel count image to convert the 100 pixels into 128 pixels. It should also be noted that one of ordinary skill in the art, upon reading this disclosure, would know the various methods to interpolate a smaller number of data units such as samples, pixels, bits, or the like to a desired number of such units. In some instances, a set of interpolation rules may be trained by sets of highly detailed inputs and/or outputs and corresponding inputs and/or outputs downsampled to smaller numbers of units, and a neural network or other machine learning model that is trained to predict interpolated pixel values using the training data. As a non-limiting example, a sample input and/or output, such as a sample picture, with sample-expanded data units (e.g., pixels added between the original pixels) may be input to a neural network or machine-learning model and output a pseudo replica sample-picture with dummy values assigned to pixels between the original pixels based on a set of interpolation rules. As a non-limiting example, in the context of an image classifier, a machine-learning model may have a set of interpolation rules trained by sets of highly detailed images and images that have been downsampled to smaller numbers of pixels, and a neural network or other machine learning model that is trained using those examples to predict interpolated pixel values in a facial picture context. As a result, an input with sample-expanded data units (the ones added between the original data units, with dummy values) may be run through a trained neural network and/or model, which may fill in values to replace the dummy values. Alternatively or additionally, processor, computing device, and/or module may utilize sample expander methods, a low-pass filter, or both. As used in this disclosure, a "low-pass filter" is a filter that passes signals with a frequency lower than a selected cutoff frequency and attenuates signals with frequencies higher than the cutoff frequency. The exact frequency response of the filter depends on the filter design. Computing device, processor, and/or module may use averaging, such as luma or chroma averaging in images, to fill in data units in between original data units.

In some embodiments, and with continued reference to FIG. 3, computing device, processor, and/or module may down-sample elements of a training example to a desired lower number of data elements. As a non-limiting example, a high pixel count image may have 256 pixels, however a desired number of pixels may be 128. Processor may down-sample the high pixel count image to convert the 256 pixels into 128 pixels. In some embodiments, processor may be configured to perform downsampling on data. Downsampling, also known as decimation, may include removing every Nth entry in a sequence of samples, all but every Nth entry, or the like, which is a process known as "compression," and may be performed, for instance by an N-sample compressor implemented using hardware or software. Anti-aliasing and/or anti-imaging filters, and/or low-pass filters, may be used to clean up side-effects of compression.

Further referring to FIG. 3, feature selection includes narrowing and/or filtering training data to exclude features and/or elements, or training data including such elements, that are not relevant to a purpose for which a trained machine-learning model and/or algorithm is being trained, and/or collection of features and/or elements, or training data including such elements, on the basis of relevance or utility for an intended task or purpose for a trained machine-learning model and/or algorithm is being trained. Feature selection may be implemented, without limitation, using any process described in this disclosure, including without limitation using training data classifiers, exclusion of outliers, or the like.

With continued reference to FIG. 3, feature scaling may include, without limitation, normalization of data entries, which may be accomplished by dividing numerical fields by norms thereof, for instance as performed for vector normalization. Feature scaling may include absolute maximum scaling, wherein each quantitative datum is divided by the maximum absolute value of all quantitative data of a set or subset of quantitative data. Feature scaling may include min-max scaling, in which each value X has a minimum value $X_{min}$ in a set or subset of values subtracted therefrom, with the result divided by the range of the values, give maximum value in the set or subset $$X_{max}: X_{new} = \frac{X - X_{min}}{X_{max} - X_{min}}.$$

Feature scaling may include mean normalization, which involves use of a mean value of a set and/or subset of values, $X_{mean}$ with maximum and minimum values:

$$X_{new} = \frac{X - X_{mean}}{X_{max} - X_{min}}.$$

Feature scaling may include standardization, where a difference between X and $X_{mean}$ is divided by a standard deviation σ of a set or subset of values:

$$X_{new} = \frac{X - X_{mean}}{\sigma}.$$

Scaling may be performed using a median value of a set or subset $X_{median}$ and/or interquartile range (IQR), which represents the difference between the $25^{th}$ percentile value and the $50^{th}$ percentile value (or closest values thereto by a rounding protocol), such as:

$$X_{new} = \frac{X - X_{median}}{IQR}.$$

Persons skilled in the art, upon reviewing the entirety of this disclosure, will be aware of various alternative or additional approaches that may be used for feature scaling.

Further referring to FIG. 3, computing device, processor, and/or module may be configured to perform one or more processes of data augmentation. "Data augmentation" as used in this disclosure is addition of data to a training set using elements and/or entries already in the dataset. Data augmentation may be accomplished, without limitation, using interpolation, generation of modified copies of existing entries and/or examples, and/or one or more generative AI processes, for instance using deep neural networks and/or generative adversarial networks; generative processes may be referred to alternatively in this context as "data synthesis" and as creating "synthetic data." Augmentation may include performing one or more transformations on data, such as geometric, color space, affine, brightness, cropping, and/or contrast transformations of images.

Still referring to FIG. 3, machine-learning module 300 may be configured to perform a lazy-learning process 320 and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 304. Heuristic may include selecting some number of highest-ranking associations and/or training data 304 elements. Lazy learning may implement any suitable lazy learning algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively or additionally, and with continued reference to FIG. 3, machine-learning processes as described in this disclosure may be used to generate machine-learning models 324. A "machine-learning model," as used in this disclosure, is a data structure representing and/or instantiating a mathematical and/or algorithmic representation of a relationship between inputs and outputs, as generated using any machine-learning process including without limitation any process as described above, and stored in memory; an input is submitted to a machine-learning model 324 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 324 may be generated by creating an artificial neural network, such as a convolutional neural network comprising an input layer of nodes, one or more intermediate layers, and an output layer of nodes. Connections between nodes may be created via the process of "training" the network, in which elements from a training data 304 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 3, machine-learning algorithms may include at least a supervised machine-learning process 328. At least a supervised machine-learning process 328, as defined herein, include algorithms that receive a training set relating a number of inputs to a number of outputs, and seek to generate one or more data structures representing and/or instantiating one or more mathematical relations relating inputs to outputs, where each of the one or more mathematical relations is optimal according to some criterion specified to the algorithm using some scoring function. For instance, a supervised learning algorithm may include sensor white images, slide images, and extracted illumination parameters as described above as inputs, and synthetic slide white images, illumination correction maps, or normalized synthetic images as outputs, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 304. Persons skilled in the art, upon reviewing the entirety of this disclosure, will be aware of various possible variations of at least a supervised machine-learning process 328 that may be used to determine relation between inputs and outputs. Supervised machine-learning processes may include classification algorithms as defined above.

With further reference to FIG. 3, training a supervised machine-learning process may include, without limitation, iteratively updating coefficients, biases, weights based on an error function, expected loss, and/or risk function. For instance, an output generated by a supervised machine-learning model using an input example in a training example may be compared to an output example from the training example; an error function may be generated based on the comparison, which may include any error function suitable for use with any machine-learning algorithm described in this disclosure, including a square of a difference between one or more sets of compared values or the like. Such an error function may be used in turn to update one or more weights, biases, coefficients, or other parameters of a machine-learning model through any suitable process including without limitation gradient descent processes, least-squares processes, and/or other processes described in this disclosure. This may be done iteratively and/or recursively to gradually tune such weights, biases, coefficients, or other parameters. Updating may be performed, in neural networks, using one or more back-propagation algorithms. Iterative and/or recursive updates to weights, biases, coefficients, or other parameters as described above may be performed until currently available training data is exhausted and/or until a convergence test is passed, where a "convergence test" is a test for a condition selected as indicating that a model and/or weights, biases, coefficients, or other parameters thereof has reached a degree of accuracy. A convergence test may, for instance, compare a difference between two or more successive errors or error function values, where differences below a threshold amount may be taken to indicate convergence. Alternatively or additionally, one or more errors and/or error function values evaluated in training iterations may be compared to a threshold.

Still referring to FIG. 3, a computing device, processor, and/or module may be configured to perform method, method step, sequence of method steps and/or algorithm described in reference to this figure, in any order and with any degree of repetition. For instance, a computing device, processor, and/or module may be configured to perform a single step, sequence and/or algorithm repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. A computing device, processor, and/or module may perform any step, sequence of steps, or algorithm in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Further referring to FIG. 3, machine learning processes may include at least an unsupervised machine-learning processes 332. An unsupervised machine-learning process, as used herein, is a process that derives inferences in datasets without regard to labels; as a result, an unsupervised machine-learning process may be free to discover any structure, relationship, and/or correlation provided in the data. Unsupervised processes 332 may not require a response variable; unsupervised processes 332 may be used to find interesting patterns and/or inferences between variables, to determine a degree of correlation between two or more variables, or the like.

Still referring to FIG. 3, machine-learning module 300 may be designed and configured to create a machine-learning model 324 using techniques for development of linear regression models. Linear regression models may include ordinary least squares regression, which aims to minimize the square of the difference between predicted outcomes and actual outcomes according to an appropriate norm for measuring such a difference (e.g. a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g. a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 3, machine-learning algorithms may include, without limitation, linear discriminant analysis. Machine-learning algorithm may include quadratic discriminant analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include various forms of latent space regularization such as variational regularization. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized trees, AdaBoost, gradient tree boosting, and/or voting classifier methods. Machine-learning algorithms may include neural net algorithms, including convolutional neural net processes.

Still referring to FIG. 3, a machine-learning model and/or process may be deployed or instantiated by incorporation into a program, apparatus, system and/or module. For instance, and without limitation, a machine-learning model, neural network, and/or some or all parameters thereof may be stored and/or deployed in any memory or circuitry. Parameters such as coefficients, weights, and/or biases may be stored as circuit-based constants, such as arrays of wires and/or binary inputs and/or outputs set at logic "1" and "0" voltage levels in a logic circuit to represent a number according to any suitable encoding system including twos complement or the like or may be stored in any volatile and/or non-volatile memory. Similarly, mathematical operations and input and/or output of data to or from models, neural network layers, or the like may be instantiated in hardware circuitry and/or in the form of instructions in firmware, machine-code such as binary operation code instructions, assembly language, or any higher-order programming language. Any technology for hardware and/or software instantiation of memory, instructions, data structures, and/or algorithms may be used to instantiate a machine-learning process and/or model, including without limitation any combination of production and/or configuration of non-reconfigurable hardware elements, circuits, and/or modules such as without limitation ASICs, production and/or configuration of reconfigurable hardware elements, circuits, and/or modules such as without limitation FPGAs, production and/or of non-reconfigurable and/or configuration non-rewritable memory elements, circuits, and/or modules such as without limitation non-rewritable ROM, production and/or configuration of reconfigurable and/or rewritable memory elements, circuits, and/or modules such as without limitation rewritable ROM or other memory technology described in this disclosure, and/or production and/or configuration of any computing device and/or component thereof as described in this disclosure. Such deployed and/or instantiated machine-learning model and/or algorithm may receive inputs from any other process, module, and/or component described in this disclosure, and produce outputs to any other process, module, and/or component described in this disclosure.

Continuing to refer to FIG. 3, any process of training, retraining, deployment, and/or instantiation of any machine-learning model and/or algorithm may be performed and/or repeated after an initial deployment and/or instantiation to correct, refine, and/or improve the machine-learning model and/or algorithm. Such retraining, deployment, and/or instantiation may be performed as a periodic or regular process, such as retraining, deployment, and/or instantiation at regular elapsed time periods, after some measure of volume such as a number of bytes or other measures of data processed, a number of uses or performances of processes described in this disclosure, or the like, and/or according to a software, firmware, or other update schedule. Alternatively or additionally, retraining, deployment, and/or instantiation may be event-based, and may be triggered, without limitation, by user inputs indicating sub-optimal or otherwise problematic performance and/or by automated field testing and/or auditing processes, which may compare outputs of machine-learning models and/or algorithms, and/or errors and/or error functions thereof, to any thresholds, convergence tests, or the like, and/or may compare outputs of processes described herein to similar thresholds, convergence tests or the like. Event-based retraining, deployment, and/or instantiation may alternatively or additionally be triggered by receipt and/or generation of one or more new training examples; a number of new training examples may be compared to a preconfigured threshold, where exceeding the preconfigured threshold may trigger retraining, deployment, and/or instantiation.

Still referring to FIG. 3, retraining and/or additional training may be performed using any process for training described above, using any currently or previously deployed version of a machine-learning model and/or algorithm as a starting point. Training data for retraining may be collected, preconditioned, sorted, classified, sanitized or otherwise processed according to any process described in this disclosure. Training data may include, without limitation, training examples including inputs and correlated outputs used, received, and/or generated from any version of any system, module, machine-learning model or algorithm, apparatus, and/or method described in this disclosure; such examples may be modified and/or labeled according to user feedback or other processes to indicate desired results, and/or may have actual or measured results from a process being modeled and/or predicted by system, module, machine-learning model or algorithm, apparatus, and/or method as "desired" results to be compared to outputs for training processes as described above.

Redeployment may be performed using any reconfiguring and/or rewriting of reconfigurable and/or rewritable circuit and/or memory elements; alternatively, redeployment may be performed by production of new hardware and/or software components, circuits, instructions, or the like, which may be added to and/or may replace existing hardware and/or software components, circuits, instructions, or the like.

Further referring to FIG. 3, one or more processes or algorithms described above may be performed by at least a dedicated hardware unit 336. A "dedicated hardware unit," for the purposes of this figure, is a hardware component, circuit, or the like, aside from a principal control circuit and/or processor performing method steps as described in this disclosure, that is specifically designated or selected to perform one or more specific tasks and/or processes described in reference to this figure, such as without limitation preconditioning and/or sanitization of training data and/or training a machine-learning algorithm and/or model. A dedicated hardware unit 336 may include, without limitation, a hardware unit that can perform iterative or massed calculations, such as matrix-based calculations to update or tune parameters, weights, coefficients, and/or biases of machine-learning models and/or neural networks, efficiently using pipelining, parallel processing, or the like; such a hardware unit may be optimized for such processes by, for instance, including dedicated circuitry for matrix and/or signal processing operations that includes, e.g., multiple arithmetic and/or logical circuit units such as multipliers and/or adders that can act simultaneously and/or in parallel or the like. Such dedicated hardware units 336 may include, without limitation, graphical processing units (GPUs), dedicated signal processing modules, FPGA or other reconfigurable hardware that has been configured to instantiate parallel processing units for one or more specific tasks, or the like, A computing device, processor, apparatus, or module may be configured to instruct one or more dedicated hardware units 336 to perform one or more operations described herein, such as evaluation of model and/or algorithm outputs, one-time or iterative updates to parameters, coefficients, weights, and/or biases, and/or any other operations such as vector and/or matrix operations as described in this disclosure.

Figure 4:
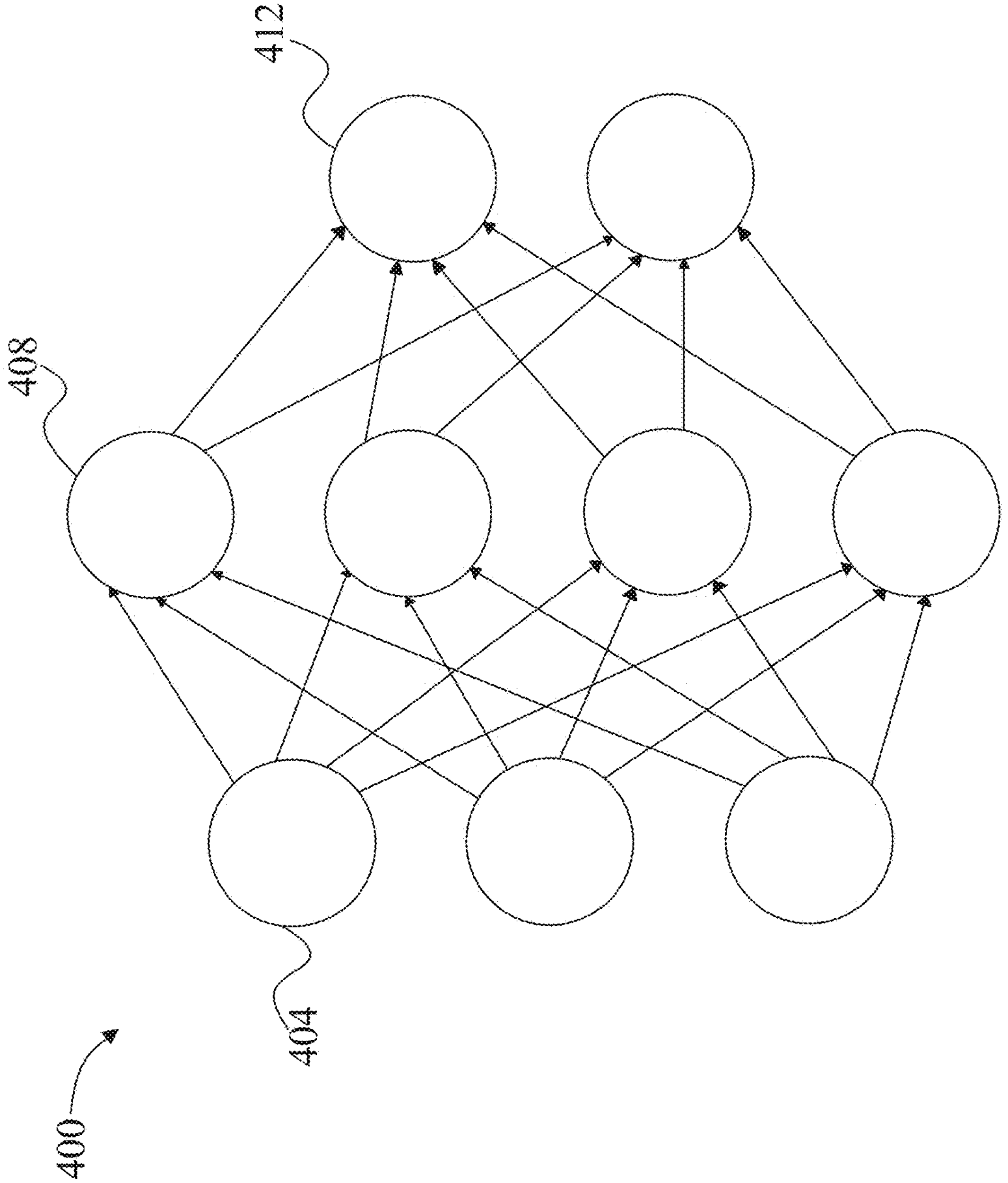
FIG. 4 is a diagram of an exemplary embodiment of a neural network.

Referring now to FIG. 4, an exemplary embodiment of neural network 400 is illustrated. A neural network 400 also known as an artificial neural network, is a network of "nodes," or data structures having one or more inputs, one or more outputs, and a function determining outputs based on inputs. Such nodes may be organized in a network, such as without limitation a convolutional neural network, including an input layer of nodes 404, one or more intermediate layers 408, and an output layer of nodes 412. Connections between nodes may be created via the process of "training" the network, in which elements from a training dataset are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning. Connections may run solely from input nodes toward output nodes in a "feed-forward" network, or may feed outputs of one layer back to inputs of the same or a different layer in a "recurrent network." As a further non-limiting example, a neural network may include a convolutional neural network comprising an input layer of nodes, one or more intermediate layers, and an output layer of nodes. A "convolutional neural network," as used in this disclosure, is a neural network in which at least one hidden layer is a convolutional layer that convolves inputs to that layer with a subset of inputs known as a "kernel," along with one or more additional layers such as pooling layers, fully connected layers, and the like.

Figure 5:
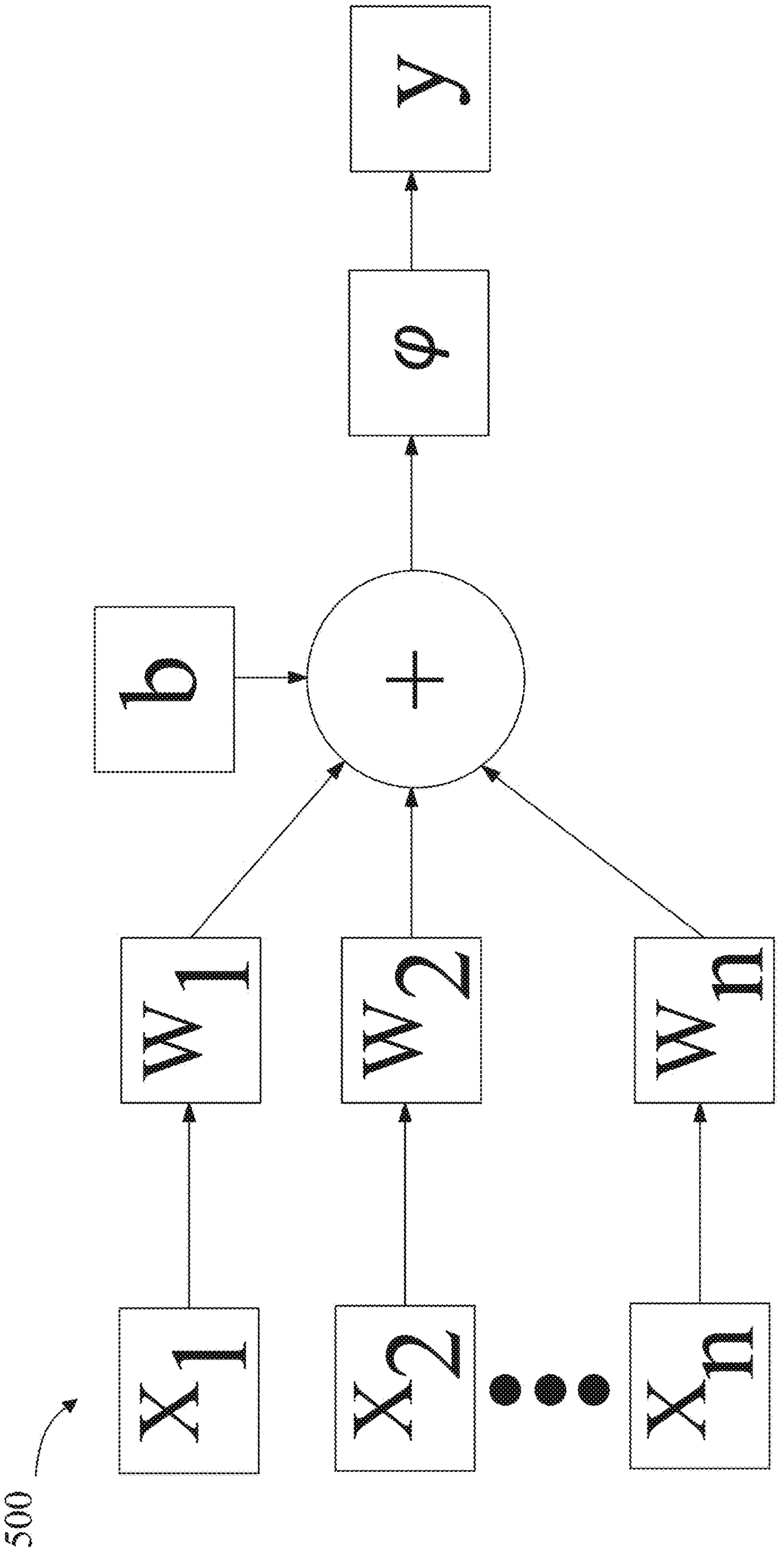
FIG. 5 is a diagram of an exemplary embodiment of a node of a neural network.

Referring now to FIG. 5, an exemplary embodiment of a node 500 of a neural network is illustrated. A node may include, without limitation, a plurality of inputs $x_i$ that may receive numerical values from inputs to a neural network containing the node and/or from other nodes. Node may perform one or more activation functions to produce its output given one or more inputs, such as without limitation computing a binary step function comparing an input to a threshold value and outputting either a logic 1 or logic 0 output or something equivalent, a linear activation function whereby an output is directly proportional to the input, and/or a non-linear activation function, wherein the output is not proportional to the input. Non-linear activation functions may include, without limitation, a sigmoid function of the form $$f(x) = \frac{1}{1 - e^{-x}}$$

given input x, a tanh (hyperbolic tangent) function, of the form $$\frac{e^x - e^{-x}}{e^x + e^{-x}},$$

a tanh derivative function such as $f(x)=\tanh^2(x)$, a rectified linear unit function such as f(x)=max(0, x), a "leaky" and/or "parametric" rectified linear unit function such as f(x)=max (ax, x) for some a, an exponential linear units function such as $$f(x) = \begin{cases} x \text{ for } x \geq 0 \\ \alpha(e^x - 1) \text{ for } x < 0 \end{cases}$$

for some value of α (this function may be replaced and/or weighted by its own derivative in some embodiments), a softmax function such as $$f(x_i) = \frac{e^x}{\sum_i x_i}$$

where the inputs to an instant layer are $x_i$, a swish function such as f(x)=x*sigmoid(x), a Gaussian error linear unit function such as $f(x)=a(1+\tanh(\sqrt{2/\pi}(x+bx^r)))$ for some values of a, b, and r, and/or a scaled exponential linear unit function such as $$f(x) = \lambda \begin{cases} \alpha(e^x - 1) \text{ for } x < 0 \\ x \text{ for } x \geq 0 \end{cases}.$$

Fundamentally, there is no limit to the nature of functions of inputs $x_i$ that may be used as activation functions. As a non-limiting and illustrative example, node may perform a weighted sum of inputs using weights $w_i$ that are multiplied by respective inputs $x_i$. Additionally or alternatively, a bias b may be added to the weighted sum of the inputs such that an offset is added to each unit in the neural network layer that is independent of the input to the layer. The weighted sum may then be input into a function φ, which may generate one or more outputs y. Weight $w_i$ applied to an input $x_i$ may indicate whether the input is "excitatory," indicating that it has strong influence on the one or more outputs y, for instance by the corresponding weight having a large numerical value, and/or a "inhibitory," indicating it has a weak effect influence on the one more inputs y, for instance by the corresponding weight having a small numerical value. The values of weights $w_i$ may be determined by training a neural network using training data, which may be performed using any suitable process as described above.

Figure 6:
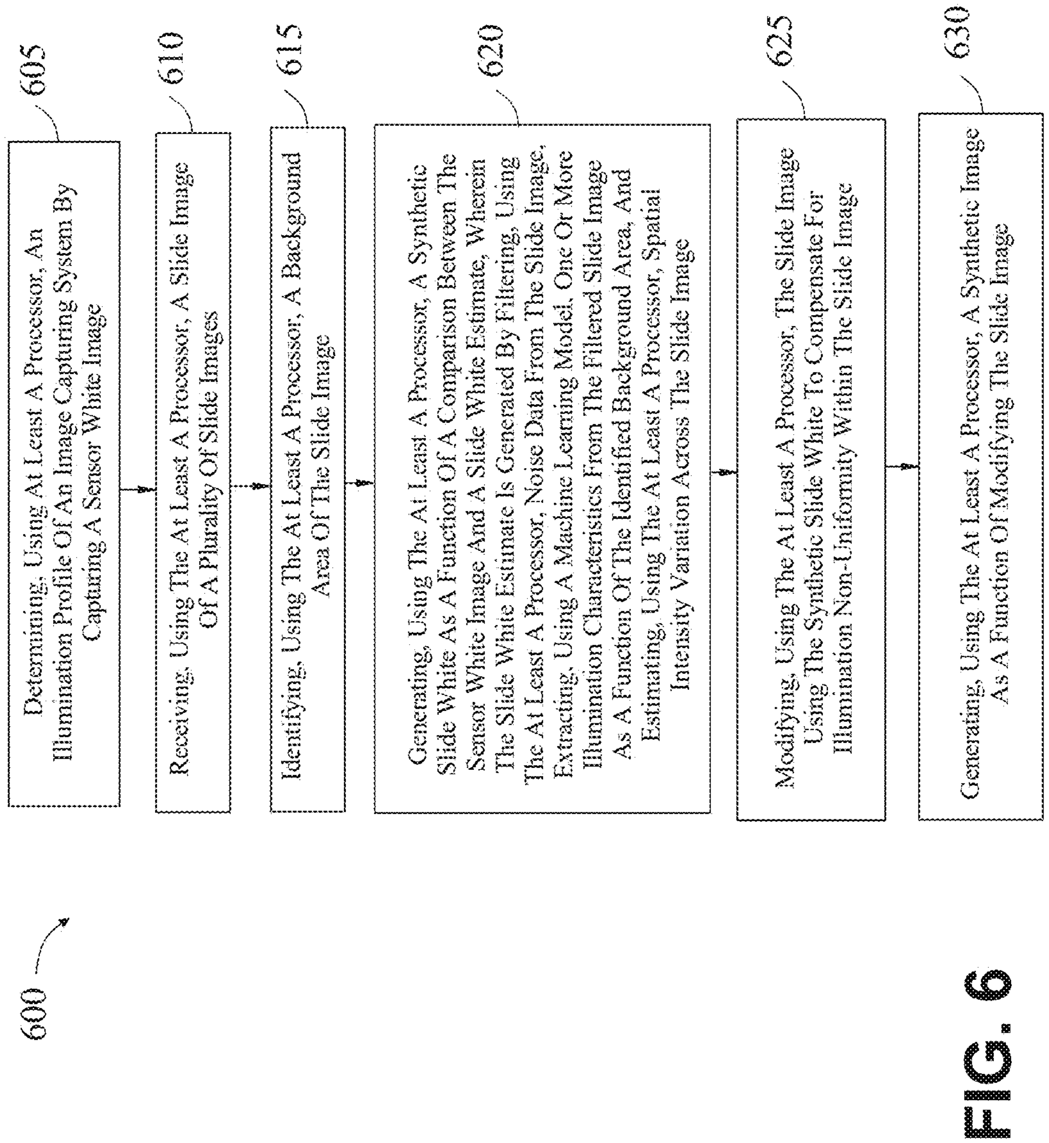
FIG. 6 is a block diagram of an exemplary method of generating a synthetic image as a function of a slide image.

Referring now to FIG. 6, a flow diagram of an exemplary method 600 for generating a synthetic image as a function of a slide image is illustrated. At step 605, method 600 includes determining, using at least a processor, an illumination profile of an image capturing system by capturing a sensor white image. In an embodiment, the sensor white image may represent illumination transmitted through an optical path of the image capturing system in an absence of a slide. In an embodiment, the illumination profile may include a radial intensity variation extending from a central region of the slide image toward peripheral regions of the slide image. In an embodiment, the at least a processor may be further configured to detect a deviation in the illumination profile based on a predefined threshold and selectively trigger capture of the slide white in response to the detected deviation. This may be implemented as described and with reference to FIGS. 1-5.

Still referring to FIG. 6, at step 610, method 600 includes receiving, using the at least a processor, a slide image of a plurality of slide images. This may be implemented as described and with reference to FIGS. 1-5.

Still referring to FIG. 6, at step 615, method 600 includes identifying, using the at least a processor, a background area of the slide image. This may be implemented as described and with reference to FIGS. 1-5.

Still referring to FIG. 6, at step 620, method 600 includes generating, using the at least a processor, a synthetic slide white as a function of a comparison between the sensor white image and a slide white estimate, wherein the slide white estimate is generated by filtering, using the at least a processor, noise data from the slide image, extracting, using a machine learning model, one or more illumination characteristics from the filtered slide image as a function of the identified background area, and estimating, using the at least a processor, spatial intensity variation across the slide image. In an embodiment, the at least a processor may be further configured to generate the synthetic slide white as a function of the sensor white image and the one or more illumination characteristics extracted from the slide image. In an embodiment, the one or more illumination characteristics may include at least an overall intensity parameter. This may be implemented as described and with reference to FIGS. 1-5.

Still referring to FIG. 6, at step 625, method 600 includes modifying, using the at least a processor, the slide image using the synthetic slide white to compensate for illumination non-uniformity within the slide image. This may be implemented as described and with reference to FIGS. 1-5.

Still referring to FIG. 6, at step 630, method 600 includes generating, using the at least a processor, a synthetic image as a function of modifying the slide image. In an embodiment, the at least a processor may be further configured to modify the slide image by performing flat field correction. In an embodiment, the at least a processor may be further configured to perform the flat field correction by adjusting pixel intensity values of the slide image based on the synthetic slide white and normalizing illumination response across different regions of the slide image. In an embodiment, the at least a processor may be further configured to stitch a plurality of modified slide images into a composite image, transmit the composite image to a downstream device, and display, using a display of the downstream device, a visual wherein the visual comprises the composite image and a side-by-side presentation of the slide image and the synthetic image. In an embodiment, the at least a processor may be further configured to receive the plurality of slide images from the image capturing system during image acquisition and generate the synthetic image inline with acquisition of the plurality of slide images. This may be implemented as described and with reference to FIGS. 1-5

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 7:
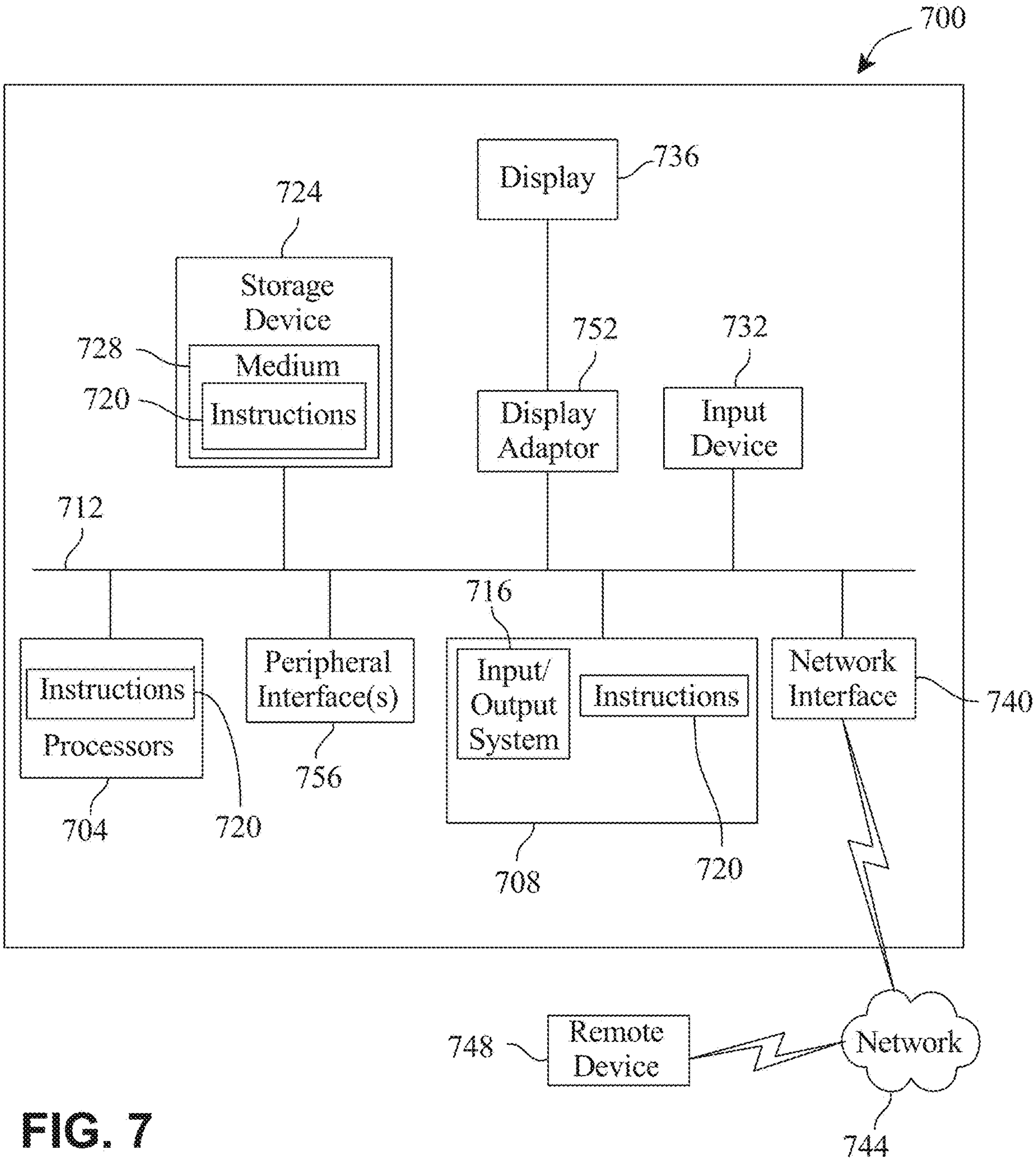
FIG. 7 is a block diagram of a computing system that can be used to implement any one or more of the methodologies disclosed herein and any one or more portions thereof.

FIG. 7 shows a diagrammatic representation of one embodiment of computing device in the exemplary form of a computer system 700 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 700 includes a processor 704 and a memory 708 that communicate with each other, and with other components, via a bus 712. Bus 712 may include any of several types of bus structures including, but not limited to, a memory bus, a memory controller, a peripheral bus, a local bus, and any combinations thereof, using any of a variety of bus architectures.

Processor 704 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 704 may be organized according to Von Neumann and/or Harvard architecture as a non-limiting example. Processor 704 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), system on module (SOM), and/or system on a chip (SoC).

Memory 708 may include various components (e.g., machine-readable media) including, but not limited to, a random-access memory component, a read only component, and any combinations thereof. In one example, a basic input/output system 716 (BIOS), including basic routines that help to transfer information between elements within computer system 700, such as during start-up, may be stored in memory 708. Memory 708 may also include (e.g., stored on one or more machine-readable media) instructions (e.g., software) 720 embodying any one or more of the aspects and/or methodologies of the present disclosure. In another example, memory 708 may further include any number of program modules including, but not limited to, an operating system, one or more application programs, other program modules, program data, and any combinations thereof.

Computer system 700 may also include a storage device 724. Examples of a storage device (e.g., storage device 724) include, but are not limited to, a hard disk drive, a magnetic disk drive, an optical disc drive in combination with an optical medium, a solid-state memory device, and any combinations thereof. Storage device 724 may be connected to bus 712 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 724 (or one or more components thereof) may be removably interfaced with computer system 700 (e.g., via an external port connector (not shown)). Particularly, storage device 724 and an associated machine-readable medium 728 may provide nonvolatile and/or volatile storage of machine-readable instructions, data structures, program modules, and/or other data for computer system 700. In one example, software 720 may reside, completely or partially, within machine-readable medium 728. In another example, software 720 may reside, completely or partially, within processor 704.

Computer system 700 may also include an input device 732. In one example, a user of computer system 700 may enter commands and/or other information into computer system 700 via input device 732. Examples of an input device 732 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 732 may be interfaced to bus 712 via any of a variety of interfaces (not shown) including, but not limited to, a serial interface, a parallel interface, a game port, a USB interface, a FIREWIRE interface, a direct interface to bus 712, and any combinations thereof. Input device 732 may include a touch screen interface that may be a part of or separate from display device 736, discussed further below. Input device 732 may be utilized as a user selection device for selecting one or more graphical representations in a graphical interface as described above.

A user may also input commands and/or other information to computer system 700 via storage device 724 (e.g., a removable disk drive, a flash drive, etc.) and/or network interface device 740. A network interface device, such as network interface device 740, may be utilized for connecting computer system 700 to one or more of a variety of networks, such as network 744, and one or more remote devices 748 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 744, may employ a wired and/or a wireless mode of communication. In general, any network topology may be used. Information (e.g., data, software 720, etc.) may be communicated to and/or from computer system 700 via network interface device 740.

Computer system 700 may further include a video display adapter 752 for communicating a displayable image to a display device, such as display device 736. Examples of a display device include, but are not limited to, a liquid crystal display (LCD), a cathode ray tube (CRT), a plasma display, a light emitting diode (LED) display, and any combinations thereof. Display adapter 752 and display device 736 may be utilized in combination with processor 704 to provide graphical representations of aspects of the present disclosure. In addition to a display device, computer system 700 may include one or more other peripheral output devices including, but not limited to, an audio speaker, a printer, and any combinations thereof. Such peripheral output devices may be connected to bus 712 via a peripheral interface 756. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. An apparatus, wherein the apparatus comprises:
- at least a computing device, wherein the at least a computing device comprises:
  - a memory; and
  - at least a processor communicatively connected to the memory, wherein the memory contains instructions configuring the at least a processor to:
    - determine an illumination profile of an image capturing system by capturing a sensor white image;
    - receive a slide image of a plurality of slide images;
    - identify a background area of the slide image;
    - generate a synthetic slide white as a function of the sensor white image and a slide white estimate, wherein the slide white estimate is generated by:
      - filtering noise data from the slide image;
      - extracting one or more illumination characteristics from the filtered slide image as a function of the identified background area; and
      - estimating spatial intensity variation across the slide image;
    - modify the slide image using the synthetic slide white to compensate for illumination non-uniformity within the slide image;
    - detect a deviation in the illumination profile based on a predefined threshold; and
    - selectively trigger capture of the slide white in response to the detected deviation.

2. The apparatus of claim 1, wherein the sensor white image represents illumination transmitted through an optical path of the image capturing system in an absence of a slide.

3. The apparatus of claim 1, wherein the illumination profile comprises a radial intensity variation extending from a central region of the slide image toward peripheral regions of the slide image.

4. The apparatus of claim 1, wherein extracting the one or more illumination characteristics from the filtered slide image as a function of the identified background area includes using a machine learning model.

5. The apparatus of claim 1, further comprising the image capturing system configured to acquire the plurality of slide images, and wherein the at least a processor is further configured to:
- receive the plurality of slide images from the image capturing system during image acquisition; and
- generate a synthetic image as a function of modifying the slide image, inline with acquisition of the plurality of slide images.

6. The apparatus of claim 1, wherein the at least a processor is further configured to modify the slide image by performing flat field correction.

7. The apparatus of claim 6, wherein the at least a processor is further configured to perform the flat field correction by:

adjusting pixel intensity values of the slide image based on the synthetic slide white; and normalizing illumination response across different regions of the slide image.

8. The apparatus of claim 1, wherein the at least a processor is further configured to:

stitch a plurality of modified slide images into a composite image;

transmit the composite image to a downstream device; and display, using a display of the downstream device, a visual wherein the visual comprises the composite image and a side-by-side presentation of the slide image and the synthetic image.

9. The apparatus of claim 1, wherein the one or more illumination characteristics comprise one or more of at least an overall intensity parameter and a radial intensity variation.

10. A method, wherein the method comprises:

determining, using at least a processor, an illumination profile of an image capturing system by capturing a sensor white image;

receiving, using the at least a processor, a slide image of a plurality of slide images;

identifying, using the at least a processor, a background area of the slide image;

generating, using the at least a processor, a synthetic slide white as a function of the sensor white image and a slide white estimate, wherein the slide white estimate is generated by:

filtering, using the at least a processor, noise data from the slide image;

extracting one or more illumination characteristics from the filtered slide image as a function of the identified background area; and estimating, using the at least a processor, spatial intensity variation across the slide image;

modifying, using the at least a processor, the slide image using the synthetic slide white to compensate for illumination non-uniformity within the slide image;

detecting, using the at least a processor, a deviation in the illumination profile based on a predefined threshold; and selectively triggering, using the at least a processor, capture of the slide white in response to the detected deviation.

11. The method of claim 10, wherein the sensor white image represents illumination transmitted through an optical path of the image capturing system in an absence of a slide.

12. The method of claim 10, wherein the illumination profile comprises a radial intensity variation extending from a central region of the slide image toward peripheral regions of the slide image.

13. The method of claim 10, wherein extracting the one or more illumination characteristics from the filtered slide image as a function of the identified background areas includes using a machine learning model.

14. The method of claim 10, further comprising:

acquiring, using the image capturing system, the plurality of slide images;

receiving, using the at least a processor, the plurality of slide images from the image capturing system during image acquisition; and generating, using the at least a processor, a synthetic image as a function of modifying the slide image, inline with acquisition of the plurality of slide images.

15. The method of claim 10, further comprising modifying, using the at least a processor, the slide image by performing flat field correction.

16. The method of claim 15, further comprising performing, using the at least a processor, the flat field correction by:

adjusting pixel intensity values of the slide image based on the synthetic slide white; and normalizing illumination response across different regions of the slide image.

17. The method of claim 10, further comprising:

stitching, using the at least a processor, a plurality of modified slide images into a composite image;

transmitting, using the at least a processor, the composite image to a downstream device; and displaying, using a display of the downstream device, a visual wherein the visual comprises the composite image and a side-by-side presentation of the slide image and the synthetic image.

18. The method of claim 10, wherein the one or more illumination characteristics comprise one or more of at least an overall intensity parameter and a radial intensity variation.

* * * * *